US011333762B2

(12) United States Patent
Di Cicco et al.

(10) Patent No.: US 11,333,762 B2
(45) Date of Patent: May 17, 2022

(54) MERGING DATA FROM MULTIPLE LIDAR DEVICES

(71) Applicant: Motional AD LLC, Boston, MA (US)

(72) Inventors: Maurilio Di Cicco, Singapore (SG); Karan Rajendra Shetti, Singapore (SG)

(73) Assignee: Motional AD LLC, Boston, MA (US)

( * ) Notice: Subject to any disclaimer, the term of this patent is extended or adjusted under 35 U.S.C. 154(b) by 64 days.

(21) Appl. No.: 16/779,291

(22) Filed: Jan. 31, 2020

(65) Prior Publication Data
US 2020/0249353 A1   Aug. 6, 2020

Related U.S. Application Data

(60) Provisional application No. 62/799,391, filed on Jan. 31, 2019.

(30) Foreign Application Priority Data

Feb. 27, 2019   (DK) ............................. PA201970131

(51) Int. Cl.
*G01S 17/42*    (2006.01)
*G01S 17/894*   (2020.01)
*G01S 17/931*   (2020.01)

(52) U.S. Cl.
CPC ............ *G01S 17/42* (2013.01); *G01S 17/894* (2020.01); *G01S 17/931* (2020.01)

(58) Field of Classification Search
CPC ...... G01S 17/42; G01S 17/894; G01S 17/931; G01S 17/89; G01S 17/87; G01S 7/48

USPC ......................................................... 356/4.01
See application file for complete search history.

(56) References Cited

U.S. PATENT DOCUMENTS

| | | | |
|---|---|---|---|
| 2013/0246020 | A1 | 9/2013 | Zeng et al. |
| 2014/0368807 | A1 | 12/2014 | Rogan |
| 2016/0161600 | A1 | 6/2016 | Eldada et al. |
| 2017/0109888 | A1 | 4/2017 | De Lima et al. |
| 2017/0176641 | A1 | 6/2017 | Zhu et al. |
| 2018/0101720 | A1 | 4/2018 | Liu |
| 2018/0313942 | A1 | 11/2018 | Wu et al. |
| 2018/0365506 | A1 | 12/2018 | Clifford et al. |
| 2019/0011529 | A1 | 1/2019 | Choi et al. |
| 2019/0011927 | A1 | 1/2019 | Mou et al. |
| 2020/0116841 | A1 | 4/2020 | Baik et al. |

FOREIGN PATENT DOCUMENTS

| | | |
|---|---|---|
| CN | 104155638 | 11/2014 |
| CN | 104180754 | 12/2014 |
| CN | 105738915 | 7/2016 |

(Continued)

OTHER PUBLICATIONS

DK 5th Technical Examination in Danish Appln. No. PA 201970131, dated Oct. 19, 2020, 2 pages.

(Continued)

*Primary Examiner* — Daniel L Murphy
(74) *Attorney, Agent, or Firm* — Fish & Richardson P.C.

(57) ABSTRACT

Among other things, a method includes receiving first LiDAR point cloud information from a first LiDAR device and second LiDAR point cloud information from a second LiDAR device, generating third point cloud information according to merging the first and second LiDAR point cloud information, and operating the vehicle based upon the third LiDAR point cloud information.

16 Claims, 19 Drawing Sheets

(56) References Cited

FOREIGN PATENT DOCUMENTS

| | | |
|---|---|---|
| CN | 105793730 | 7/2016 |
| CN | 106157309 | 11/2016 |
| CN | 106680798 | 5/2017 |
| CN | 107161141 A | 9/2017 |
| CN | 107819799 A | 3/2018 |
| CN | 108318895 A | 7/2018 |
| CN | 108535736 A | 9/2018 |
| EP | 3078935 | 10/2016 |
| KR | 20170127350 | 11/2017 |
| WO | WO 2018195996 | 11/2018 |
| WO | WO 2019079211 | 4/2019 |
| WO | WO 2019079219 | 4/2019 |
| WO | WO 2019079311 | 4/2019 |
| WO | WO 2019079511 | 4/2019 |

OTHER PUBLICATIONS

DK 1st Office Action in Danish Appln. No. PA201970131, dated May 9, 2019, 9 pages.
DK 2nd Office Action in Danish Appln. No. PA201970131, dated Nov. 13, 2019, 4 pages.
DK 3rd Office Action in Danish Appln. No. PA201970131, dated May 25, 2020, 4 pages.
DK 4th Office Action in Danish Appln. No. 201970131, dated Jun. 29, 2020, 6 pages.
PCT International Search Report and Written Opinion in International Appln. No. PCT/IS2020/050802, dated Apr. 14, 2020, 10 pages.
DK Office Action in Danish Appln. No. PA201970131, dated May 25, 2020, 4 pages.
[No. Author Listed], "J3016: Taxonomy and Definitions for Terms Related to On-Road Motor Vehicle Automated Driving Systems" SAE International, Sep. 2016, 30 pages.
DK Office Action in Danish Appln. No. PA201970131, dated May 9, 2019, 9 pages.
DK Office Action in Danish Appln. No. PA201970131, dated Nov. 13, 2019, 4 pages.
DK Office Action in Danish Appln. No. 201970131, dated Jun. 29, 2020, 6 pages.
Kwon et al., "A Development of Effective Object Detection System Using Multi-Device LiDAR Sensor in Vehicle Driving Environment" Journal of the KIECS, Apr. 30. 2018, 13:313. 15 pages (with English Translation).

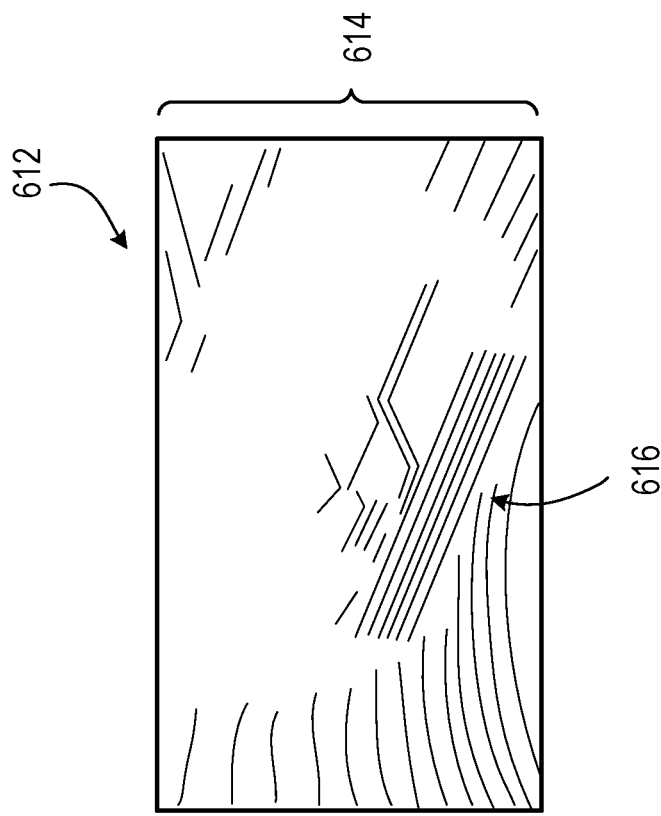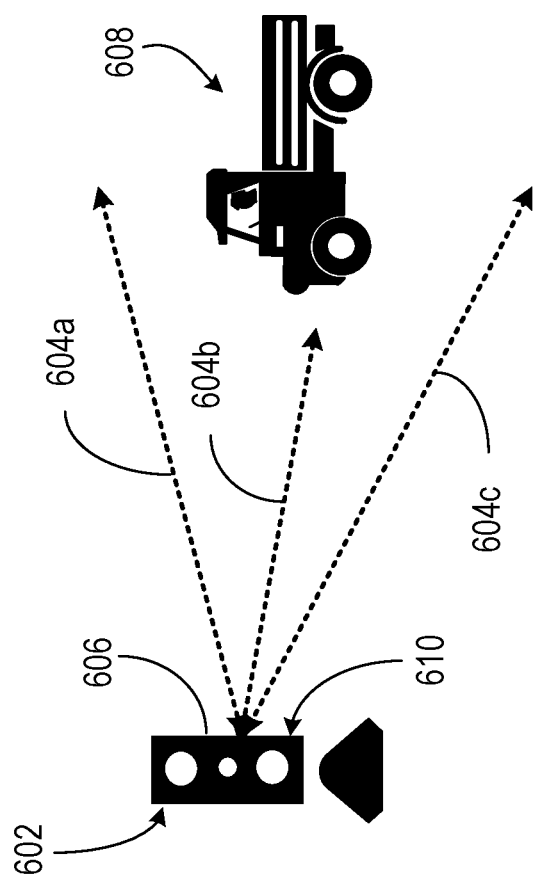
FIG. 6

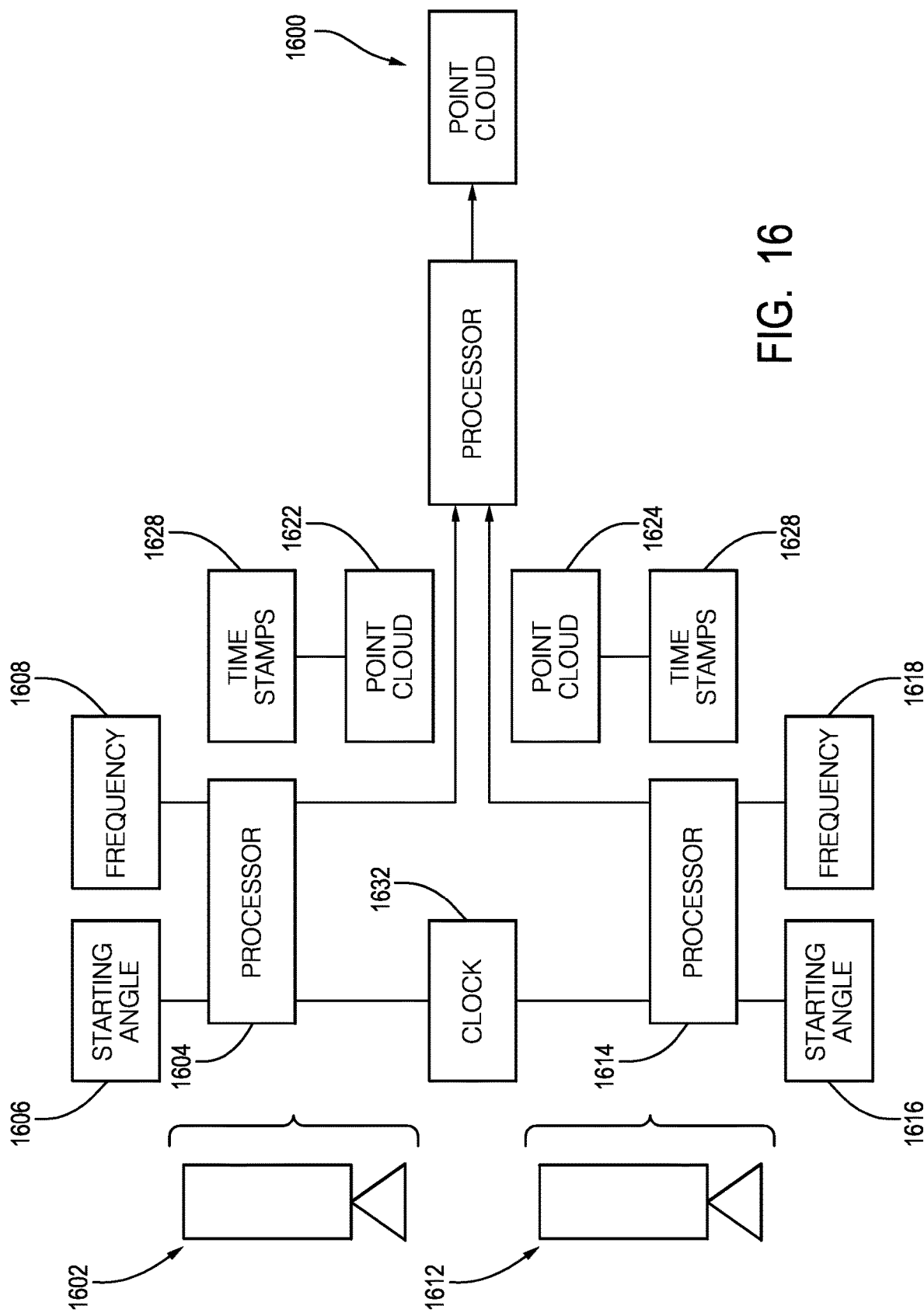

# US 11,333,762 B2

MERGING DATA FROM MULTIPLE LIDAR DEVICES

CROSS-REFERENCE TO RELATED APPLICATIONS

This application claims priority to U.S. Provisional Patent Application No. 62/799,391, filed Jan. 31, 2019, and Danish Patent Application No. PA201970131, filed Feb. 27, 2019, the entire contents of each of which are incorporated herein by reference.

FIELD OF THE INVENTION

This description relates to merging data from multiple LiDAR devices.

SUMMARY

Among other things, we describe techniques for merging data from multiple LiDAR devices that have different physical locations and may have different starting angles and different frequencies.

In an embodiment, a system includes at least two LiDAR devices configured to detect light reflected from objects proximate to the vehicle and generate LiDAR point cloud information based on the detected light, wherein a first LiDAR device is at a first position of the vehicle and is configured for a first starting angle and a first frequency, and a second LiDAR device is at a second position of the vehicle and is configured for a second starting angle and a second frequency; one or more computer-readable media storing computer-executable instructions; one or more processors communicatively coupled to the at least two LiDAR devices and configured to execute the computer executable instructions, the execution carrying out operations including: receiving first LiDAR point cloud information from the first LiDAR device and second LiDAR point cloud information from the second LiDAR device, receiving first timestamp information associated with the first LiDAR point cloud information and second timestamp information associated with the second LiDAR point cloud information, and in accordance with the first and second LiDAR point cloud information, first and second timestamp information, first starting angle, a first frequency, second starting angle, and second frequency, generating third point cloud information merging the first and second LiDAR point cloud information; and a control circuit communicatively coupled to the one or more processors, wherein the control circuit is configured to operate the vehicle based upon the third LiDAR point cloud information.

In an embodiment, a method includes configuring a first LiDAR device to spin at a first frequency and from a first starting angle; configuring a second LiDAR device to spin at a second frequency and from a second starting angle different from the first starting angle; receiving, from the first LiDAR device, information representing a first detected light point and a first timestamp representing a time at which the first point was illuminated; receiving, from the second LiDAR device, information representing a second detected light point and a second timestamp representing a time at which the second point was illuminated, wherein a difference between the time of the first timestamp and the time of the second timestamp is less than an inverse of the first frequency; determining that the first detected light point and the second detected light point correspond to the same location relative to the vehicle, and in accordance with determining the first detected light point and the second detected light point correspond to the same location, generating LiDAR point cloud information including the first and second detected light points at the same coordinates relative to a fixed origin of the vehicle.

These and other aspects, features, and implementations can be expressed as methods, apparatus, systems, components, program products, means or steps for performing a function, and in other ways.

These and other aspects, features, and implementations will become apparent from the following descriptions, including the claims.

These, and other aspects, features, and implementations have one or more of the following advantages. Timestamp information can be used to more accurately combine LiDAR point clouds. Timestamps can be used to coordinate between two or more LiDARs that have different starting angles and/or different frequencies. If the LiDARs have intentionally staggered starting angles, the information will still be recent enough to use in most scenarios (e.g., identifying a pedestrian's movement). If one LiDAR is occluded at a particular point in time, information from another LiDAR can be used.

BRIEF DESCRIPTION OF THE DRAWINGS

FIG. 6 shows an example of a LiDAR system.

FIG. 16 shows components of a system used to generate a consolidated point cloud.

DETAILED DESCRIPTION

Figure 1:
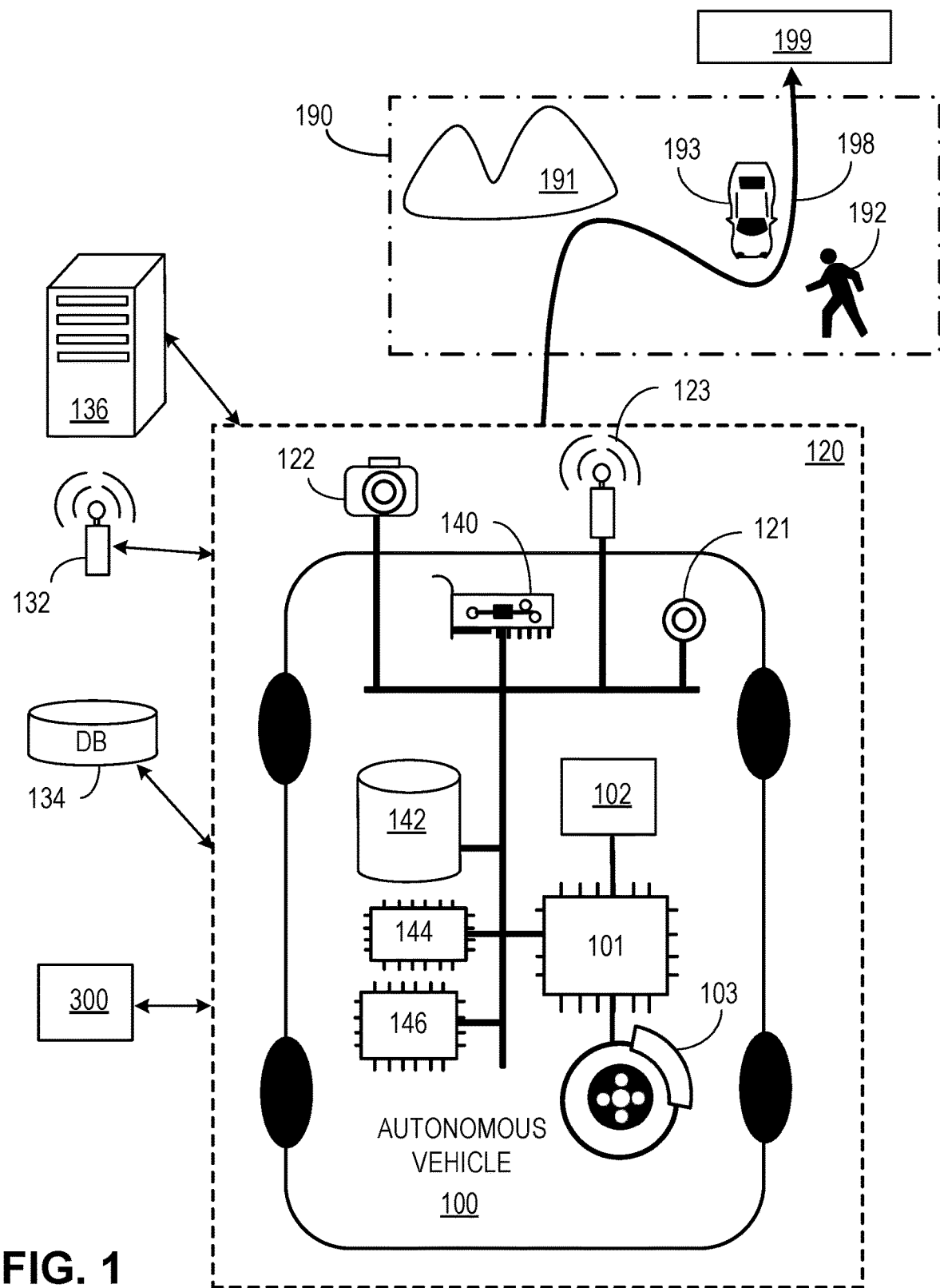
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:
1. General Overview
2. System Overview
3. Autonomous Vehicle Architecture
4. Autonomous Vehicle Inputs
5. Autonomous Vehicle Planning
6. Autonomous Vehicle Control
7. Multiple LiDAR Devices General Overview As described in more detail below with respect to FIGS. 13-19, a vehicle (such as an autonomous vehicle) can have multiple LiDAR devices mounted at different locations of the vehicle. Data from the LiDAR devices can be merged in order to take advantage of this redundancy.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, the communication devices 140 include wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
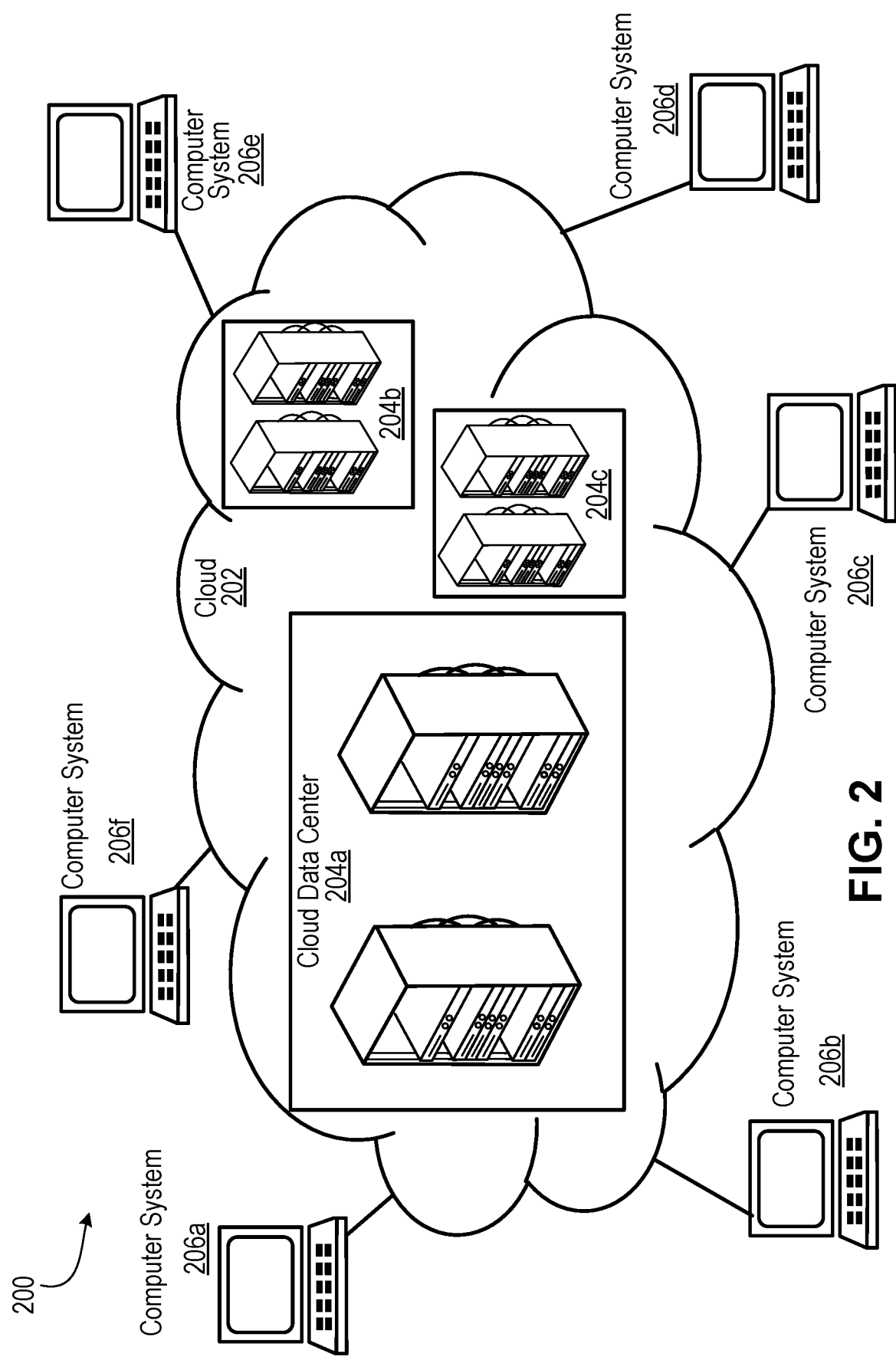
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multi protocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-206f or cloud computing services consumers are connected to the cloud 202 through network links and network adapters. In an embodiment, the computing systems 206a-206f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
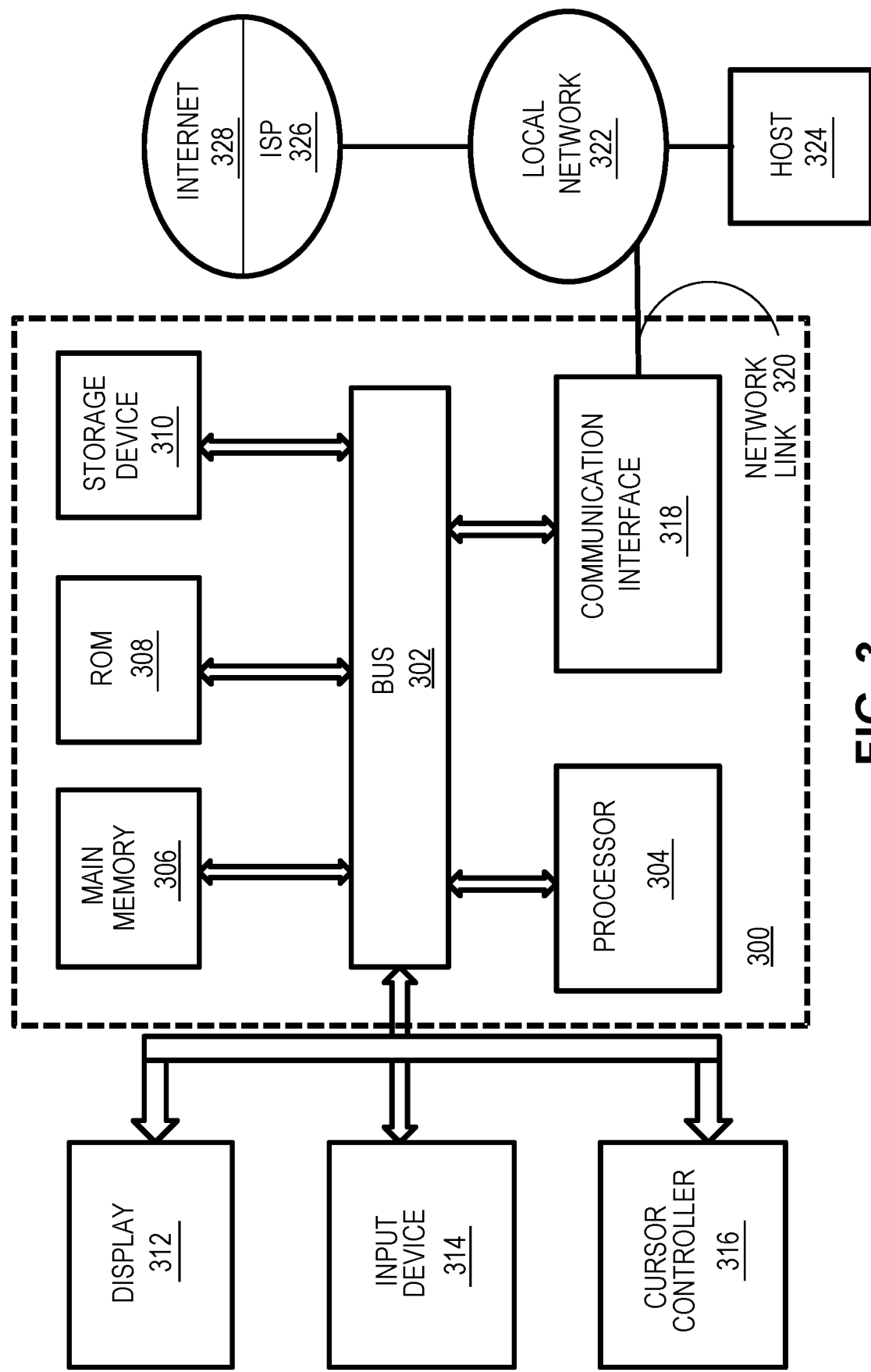
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media are distinct from but may be used in conjunction with transmission media. Transmission media participate in transferring information between storage media. For example, transmission media include coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and sends the instructions over a telephone line using a modem. A modem local to the computer system 300 receives the data on the telephone line and uses an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
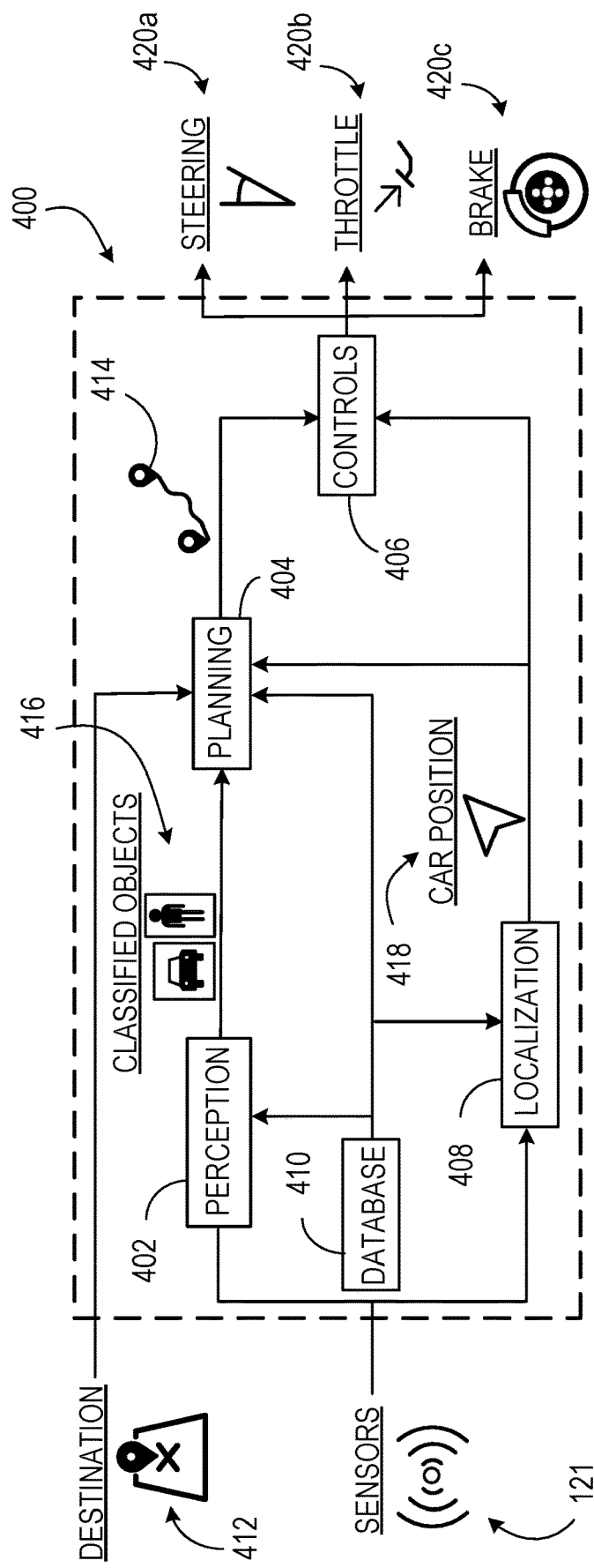
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-420c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
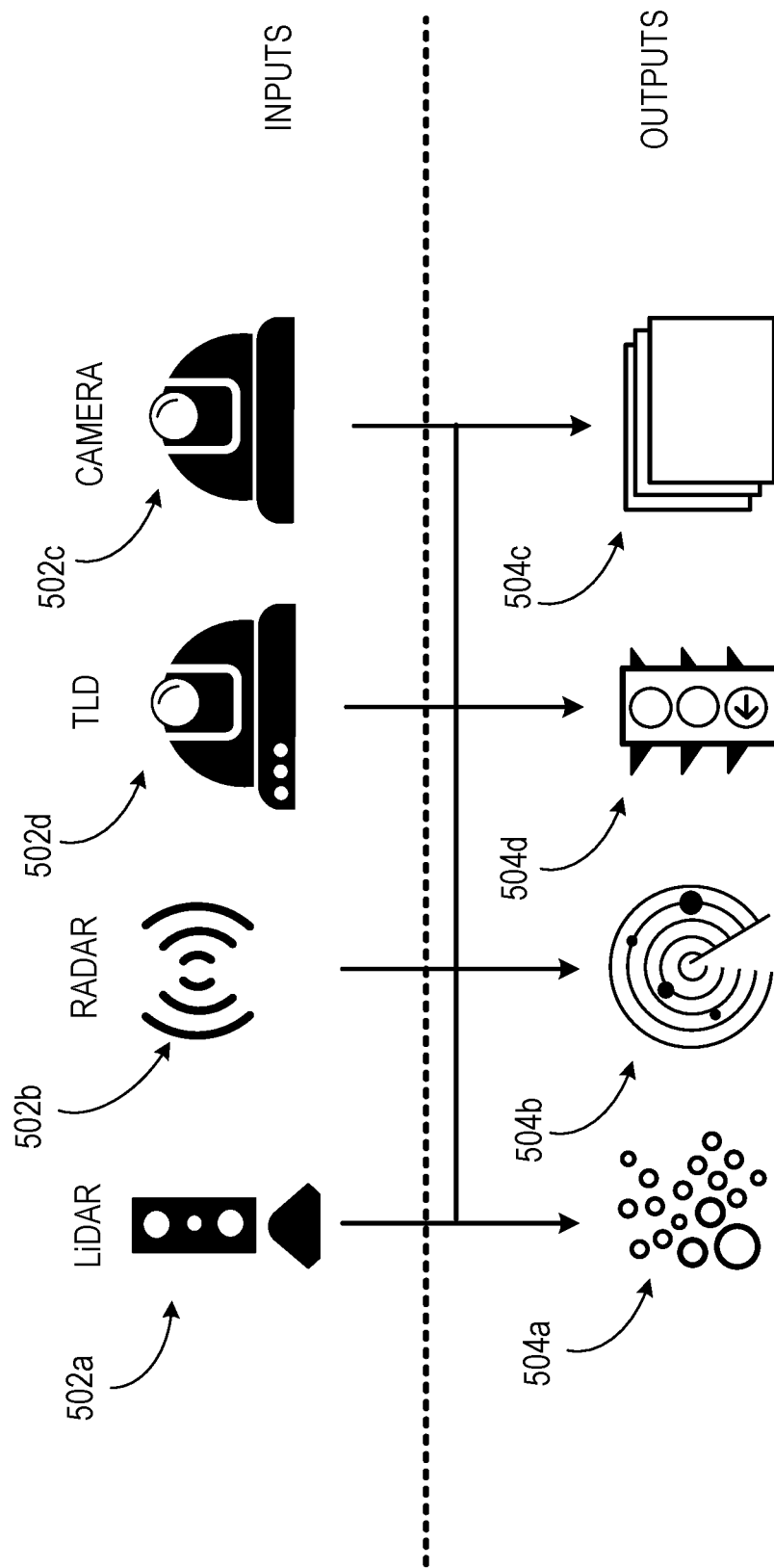
FIG. 5 shows an example of inputs and outputs that may be used by a perception module.

FIG. 5 shows an example of inputs 502a-502d (e.g., sensors 121 shown in FIG. 1) and outputs 504a-504d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-504d are combined using a sensor fusion technique. Thus, either the individual outputs 504a-504d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-604c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
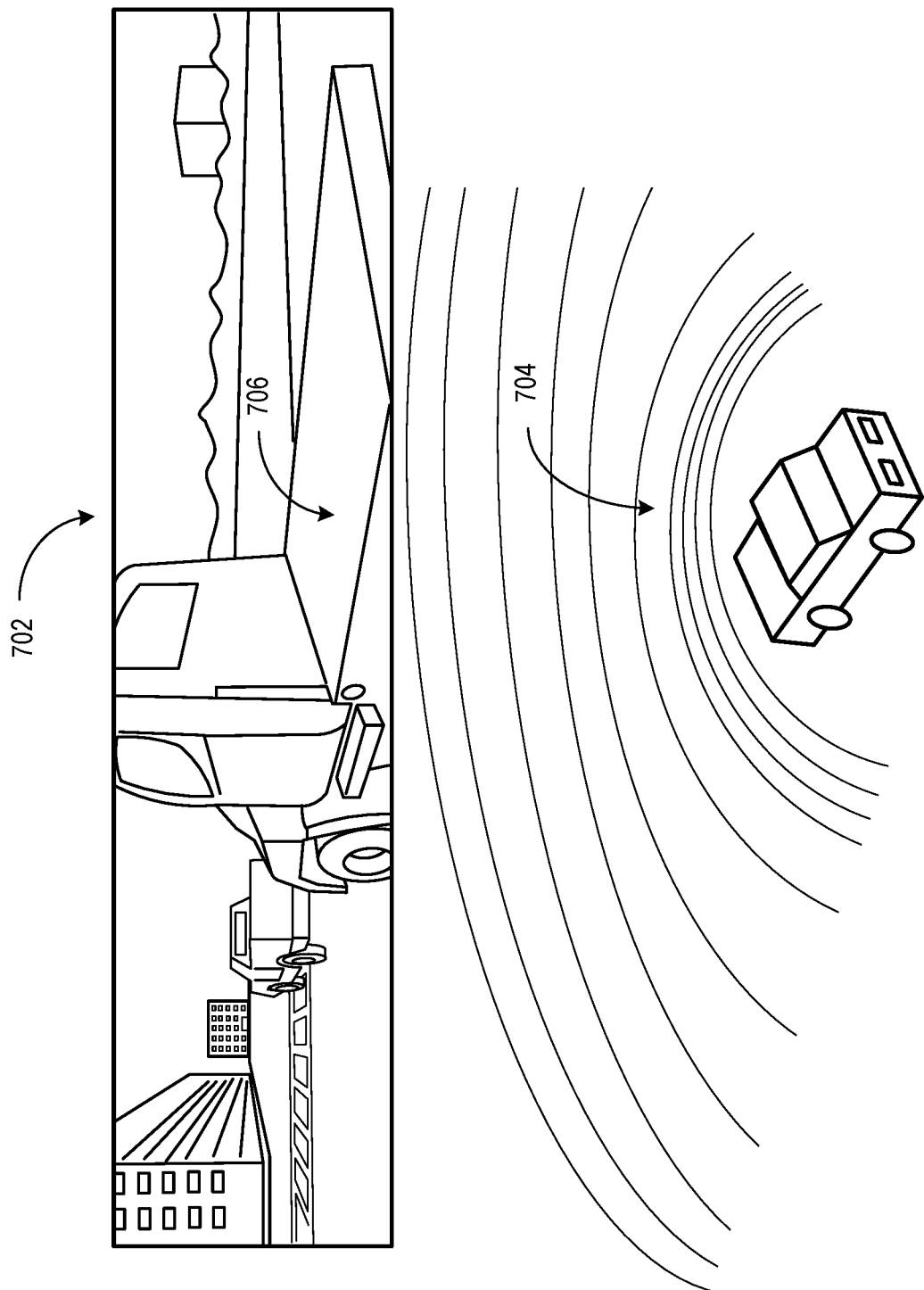
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
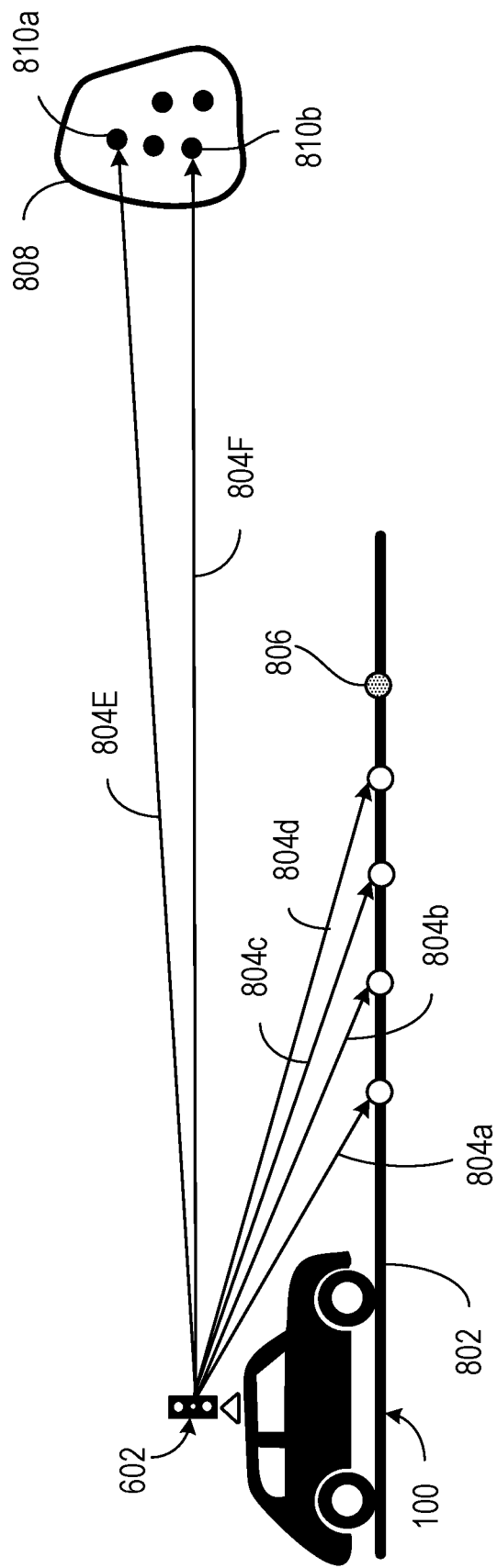
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-804d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-804f emitted by the LiDAR system 602 will be reflected from points 810a-810b in a manner inconsistent with the expected consistent manner. From this information, the AV 100 can determine that the object 808 is present.

Path Planning

Figure 9:
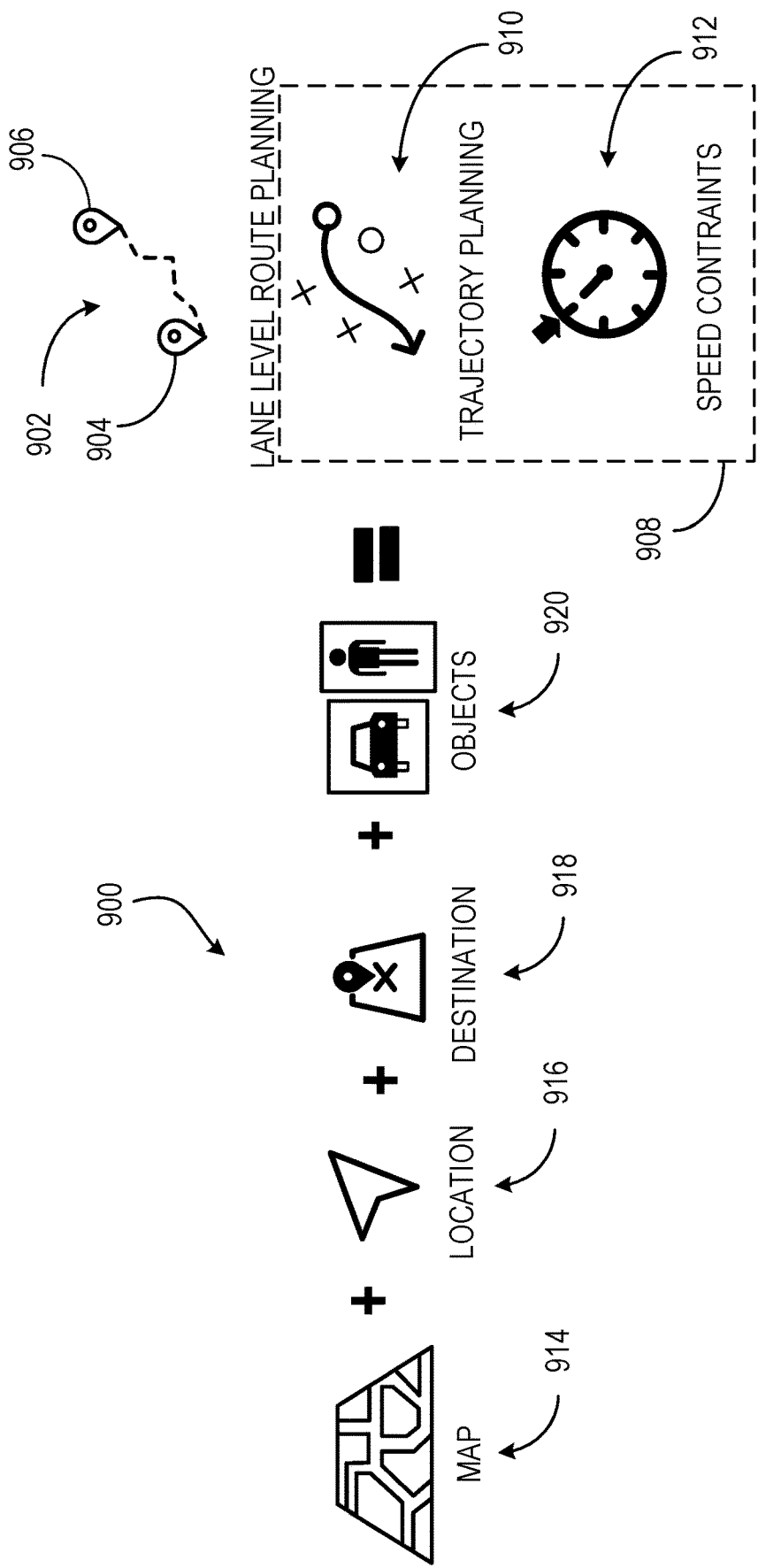
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or un-expected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
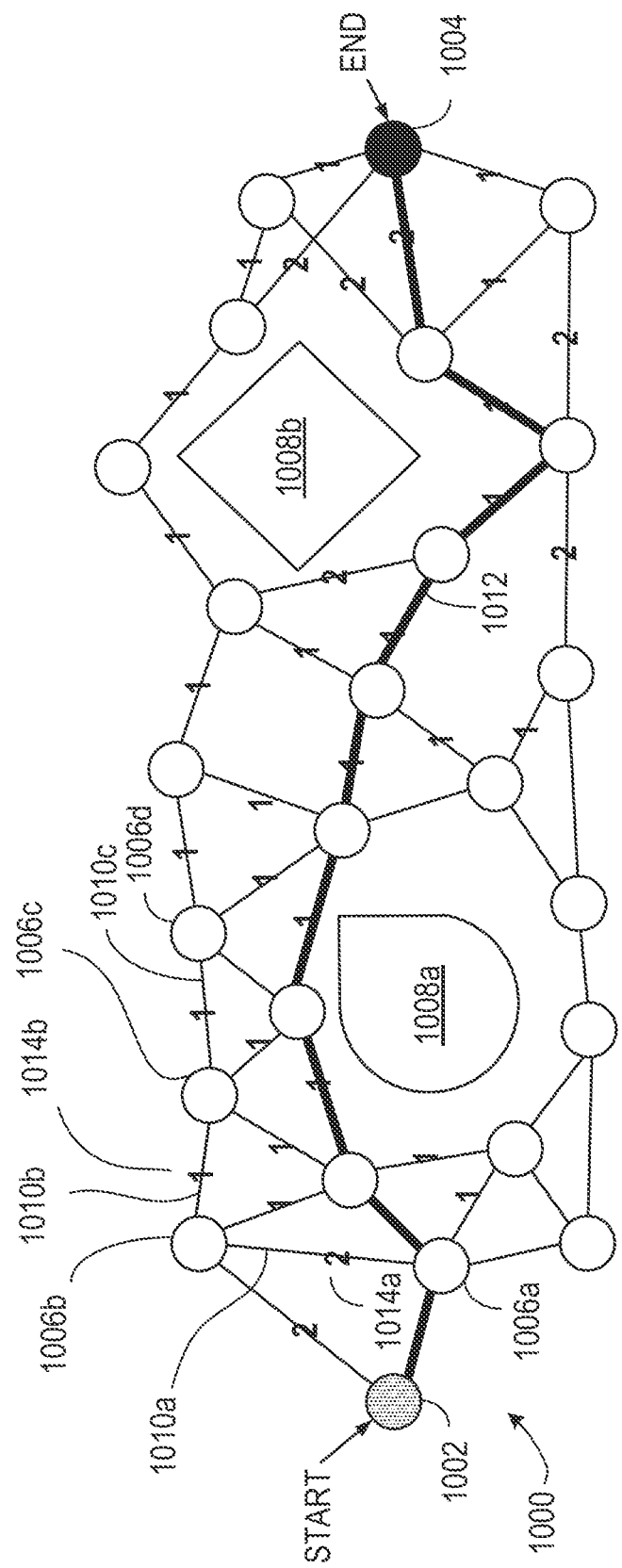
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-1006d representing different locations between the start point 1002 and the end point 1004 that could be occupied by an AV 100. In some examples, e.g., when the start point 1002 and end point 1004 represent different metropolitan areas, the nodes 1006a-1006d represent segments of roads. In some examples, e.g., when the start point 1002 and the end point 1004 represent different locations on the same road, the nodes 1006a-1006d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-1006d are distinct from objects 1008a-1008b which cannot overlap with a node. In an embodiment, when granularity is low, the objects 1008a-1008b represent regions that cannot be traversed by automobile, e.g., areas that have no streets or roads. When granularity is high, the objects 1008a-1008b represent physical objects in the field of view of the AV 100, e.g., other automobiles, pedestrians, or other entities with which the AV 100 cannot share physical space. In an embodiment, some or all of the objects 1008a-1008b are a static objects (e.g., an object that does not change position such as a street lamp or utility pole) or dynamic objects (e.g., an object that is capable of changing position such as a pedestrian or other car).

The nodes 1006a-1006d are connected by edges 1010a-1010c. If two nodes 1006a-1006b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-1010c are often bidirectional, in the sense that an AV 100 travels from a first node to a second node, or from the second node to the first node. In an embodiment, edges 1010a-1010c are unidirectional, in the sense that an AV 100 can travel from a first node to a second node, however the AV 100 cannot travel from the second node to the first node. Edges 1010a-1010c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-1010c has an associated cost 1014a-1014b. The cost 1014a-1014b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-1010b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
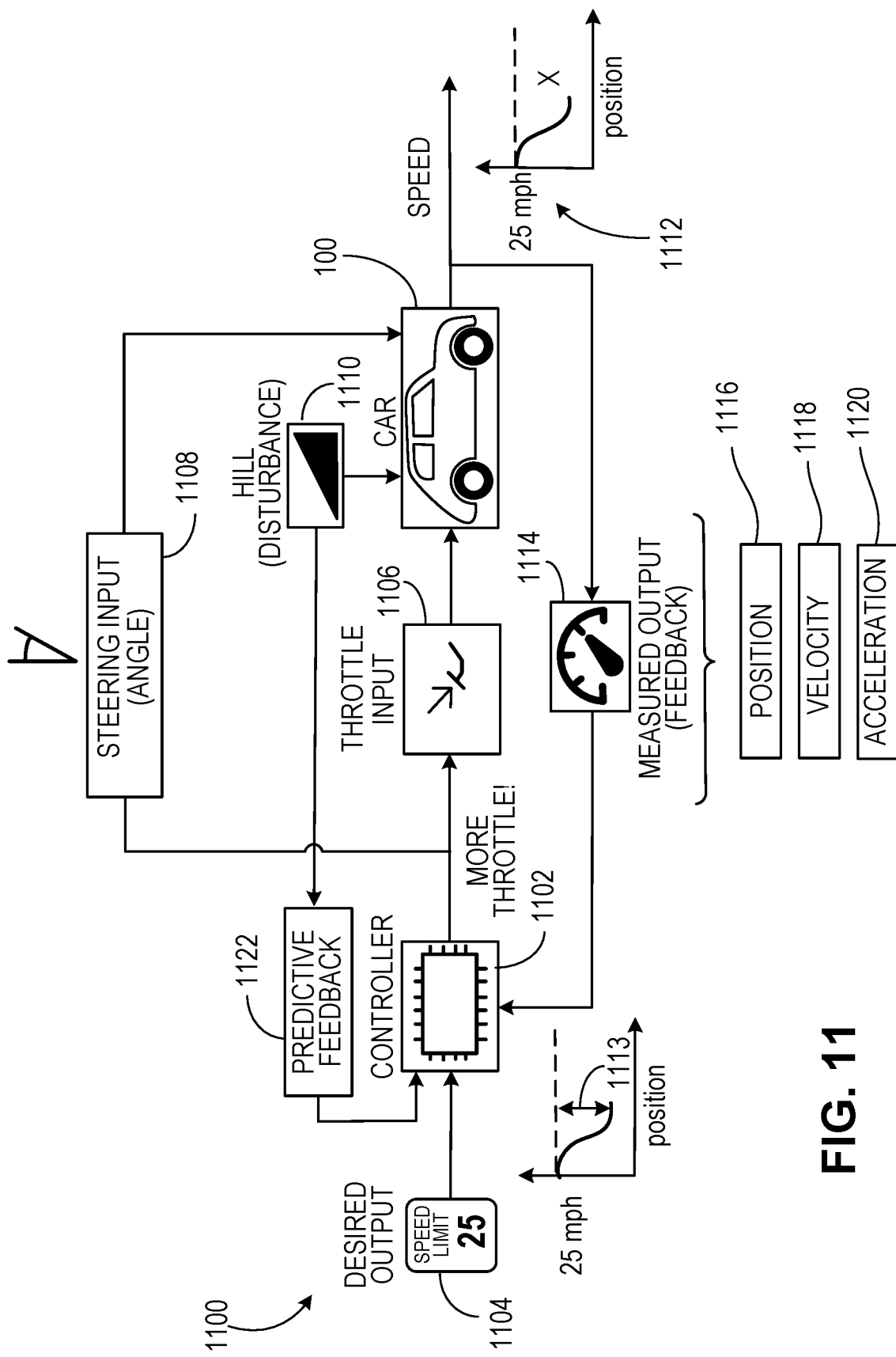
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
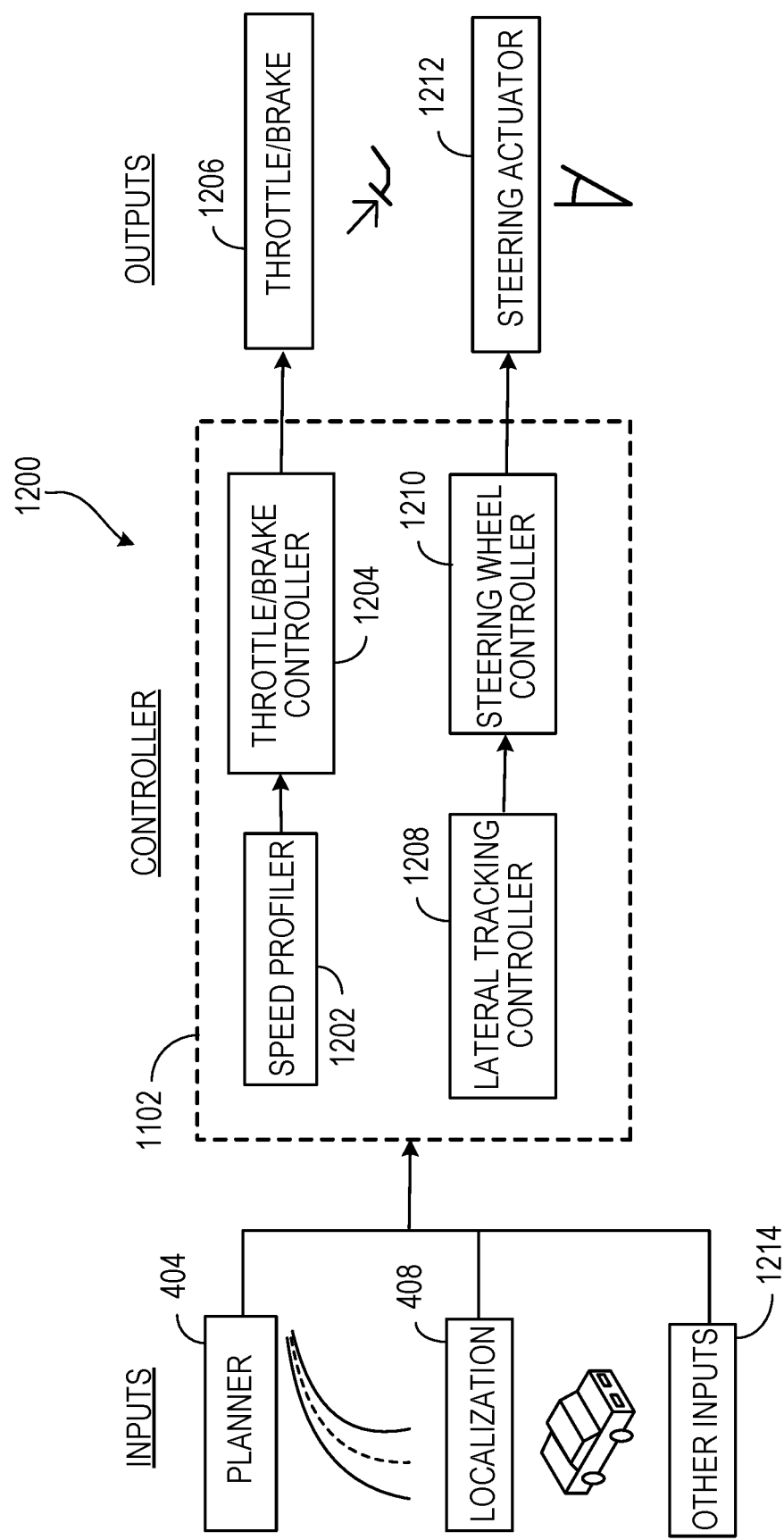
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Multiple LiDAR Devices

Figure 13:
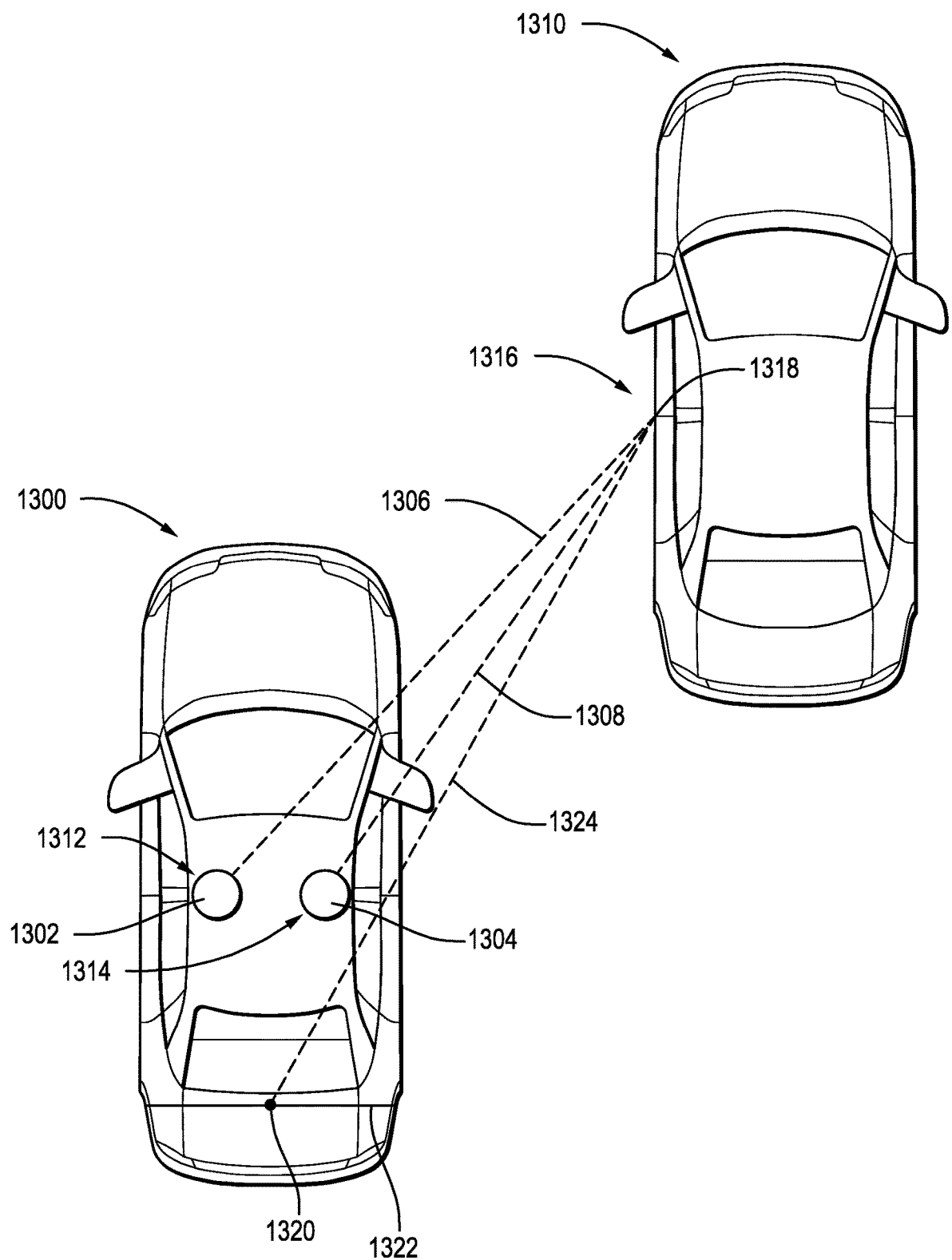
FIG. 13 shows an AV having two LiDAR devices.

FIG. 13 shows an AV 1300 having two LiDAR devices 1302, 1304. The AV 1300 is an example of the AV 100 shown in FIG. 1. The LiDAR devices 1302, 1304 are examples of the LiDAR system 502*a* shown in FIG. 5. As described in more detail above with respect to FIGS. 5-8, a LiDAR device emits light (e.g., electromagnetic radiation in the ultraviolet, infrared, or laser spectra, or any other kind of electromagnetic radiation) which illuminates a point on a physical object (e.g., other vehicles, pedestrians, street signs, etc.) in proximity to the LiDAR device and is reflected back to the LiDAR device, which detects (e.g., observes) the illuminated point. (The time at which a point is illuminated and the time at which a point is detected is indistinguishable because the speed at which light travels is so high.) For example, as shown in FIG. 13, each LiDAR device 1302, 1304 emits light 1306, 1308 which is reflected from a nearby vehicle 1310 (e.g., a vehicle on the same road as the AV 1300). Although two LiDAR devices 1302, 1304 are shown here, the techniques described herein are also applicable to configurations of three or more LiDAR devices.

Each of the two LiDAR devices 1302, 1304 is positioned at a different location on the AV 1300. In an embodiment, one of the devices 1302 is attached (e.g., welded, affixed, or mounted) at one position 1312, and the other device 1304 is attached at another position 1314. While some attachment techniques (e.g., welding) are semi-permanent and are unlikely to change during the life of the AV 1300, other attachment techniques (e.g., magnetic attachment) enable the LiDAR devices 1302, 1304 to be removed (e.g., for maintenance or replacement) or moved to a different position at a different time.

Because the two LiDAR devices 1302, 1304 are positioned at different locations, the data generated by the two devices is consolidated for use by the AV 1300. As noted above with respect to FIG. 5, LiDAR data takes the form of collections of 3D or 2D points known as point clouds. Each point in a point cloud represents an illuminated point on an object in the environment 190 (e.g., the nearby vehicle 1310) and has a set of coordinates defining its location in the cloud. When detecting an illuminated point, a LiDAR device assigns the point to a set of coordinates in the point cloud, as described in more detail below with respect to FIG. 14. Further, when multiple LiDAR devices are used simultaneously, each LiDAR device may have its own coordinate system. Thus, in order to use data from both LiDAR devices, the coordinate systems are consolidated. One technique to consolidate the coordinate systems includes the use of a common point of reference. For example, the coordinates of each point can be defined based on their location relative to a specific location 1320 on the AV 1300. In this way, when a point 1316 is detected by one LiDAR device 1302 and another point 1318 is detected by the other LiDAR device 1304, the two points 1316, 1318 will have coordinates defined relative to the same location 1320 on the AV 1300.

If, as shown in FIG. 13, the two points 1316, 1318 correspond to approximately the same location relative to the AV 1300, the two points 1316, 1318 will have approximately the same coordinates. Put another way, the two points 1316, 1318 will be located in the point cloud at the same location, including, e.g., the same distance 1324, relative to the location 1320 used as the common point of reference. The two points 1316, 1318 describe the same location from two different vantage points due to the differences in the relative spatial position of the two LIDAR devices 1302 and 1304.

The example location 1320 shown as a common point of reference in FIG. 13 is a point in the center of the rear axle 1322, but any location on the AV 1300 could be used. The consolidation of the coordinate systems is carried out in order to merge the point clouds generated by each LiDAR device 1302, 1304, as described in more detail below.

Figure 14:
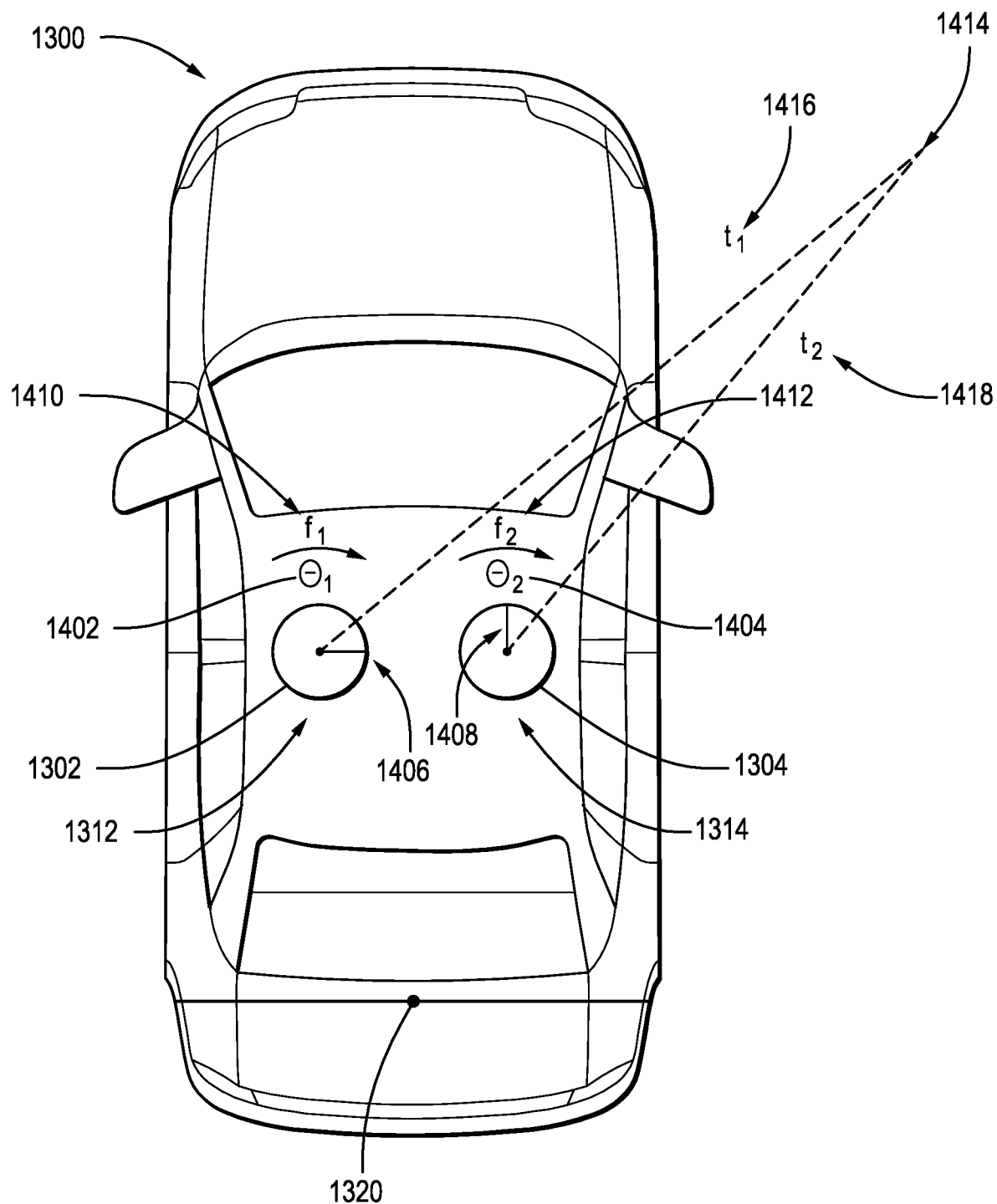
FIGS. 14-15 show the LiDAR devices in more detail.

FIG. 14 shows the LiDAR devices 1302, 1304 in more detail. As noted above, each LiDAR device has a different physical position 1312, 1314 on the AV 1300. In an embodiment, one LiDAR device 1302 has a different starting angle 1402 than the starting angle 1404 of the other LiDAR device 1304. In use, a LiDAR device spins rapidly in order to illuminate objects in the entire field of view of the LiDAR device, e.g., everything in a 360 degree field of view. As described above with respect to FIG. 6, a LiDAR device typically has one or more light emitters 606. For the purposes of the example shown in FIG. 14, the LiDAR devices 1302, 1304 will be described as having one light emitted, but the techniques described here apply for LiDAR devices having multiple light emitters.

The starting angles 1402, 1404 are defined based on the positions of the light emitters 1406, 1408 of the LiDAR devices 1302, 1304. In an embodiment, the first LiDAR device 1302 is configured for a starting angle 1402 of zero degrees, that is, the LiDAR device defines the completion of a full rotation and the start of a new full rotation when the light emitter 1406 is positioned at zero degrees. The second LiDAR device 1304 is configured for a starting angle 1404 of ninety degrees, that is, the LiDAR device defines the completion of a full rotation and the start of a new full rotation when the light emitter 1408 is positioned at ninety degrees. In an embodiment, the light emitters 1406, 1408 return to their respective starting angles 1402, 1404 when the respective LiDAR device 1302, 1304 is powered on.

In an embodiment, one LiDAR device 1302 is configured for a different frequency 1410 than the frequency 1412 of the other LiDAR device 1304. The frequency of a LiDAR device corresponds to its speed of rotation. For example, if a LiDAR device has a frequency of ten hertz, then the light emitter of the LiDAR device completes a full rotation ten times per second. Put another way, the period of the LiDAR device is 1/10th of a second, because the period is the inverse of the frequency.

Because the LiDAR devices 1302, 1304 may have different starting angles 1402, 1404 and/or different frequencies 1410, 1412, the LiDAR devices 1302, 1304 will usually illuminate any particular point at different times. For example, as the first LiDAR device 1302 rotates (e.g., at its frequency 1410), it will illuminate a point at a particular location 1414 at a first time 1416, and as the second LiDAR device 1304 rotates (e.g., at its frequency 1412), it will illuminate a point at that location 1414 at a second time 1418.

The time at which a point is illuminated depends on the starting angles 1402, 1404 and starting frequencies 1410, 1412. In an embodiment, multiple LiDAR devices have intentionally staggered starting angles. After one LiDAR device detects a point, before its rotational cycle is complete, the other LiDAR device(s) will have detected another point at the same location. In this way, motion of an object can be observed with better temporal precision.

In an embodiment, if the starting frequencies 1410, 1412 are both ten hertz, one starting angle 1402 is zero degrees, and the other starting angle 1404 is ninety degrees, then the first LiDAR device 1302 will illuminate a point at a particular location 1414 1/40th of a second earlier or later the second LiDAR device 1304. This is because the second LiDAR device 1304 begins a full rotation at one-quarter of a rotation (90 divided by 360) off from the first LiDAR device 1302, and one rotation lasts for 1/10th of a second. In other words, if the frequencies of the LiDAR devices 1302, 1304 are the same, then the difference is calculated by multiplying the period by the difference in angles in degrees divided by 360. Other units of angle, e.g., radians, could also be used.

In an embodiment, if the frequency 1410 of the first LiDAR device 1302 is 10 hertz, and the frequency 1412 of the second LiDAR device 1304 is twenty hertz, and the starting angles 1402, 1404 are both the same, e.g., both zero degrees, then the second LiDAR device 1304 will illuminate a particular location 1414 twice as frequently as will the first LiDAR device 1302 because its frequency 1412 is twice as high. In other words, by the time the first LiDAR device 1302 has completed a full rotation and illuminated a point at a location 1414, the second LiDAR device has illuminated a point at that location 1414 two times.

Varying the frequency and/or starting angles benefits the ability of the AV 1300 to perceive its surrounding environment 190. For example, when multiple starting angles are used, multiple LiDAR devices detect points at a location more frequently than if only one LiDAR device were used, since points at the location in the environment 190 will be illuminated multiple times during the periods of rotation. In contrast, if the same starting angle and frequency were used, then the multiple LiDAR devices would detect points at the same location at approximately the same time. In response to rapid changes in environment 190, e.g., high-speed, high-density traffic or crowds of pedestrians, the ability to detect points at the same location more frequently enables an AV 1300 to perceive changes in the environment 190 (e.g., movement of objects) more precisely. Further, because multiple LiDAR devices at different locations are used, if one LiDAR device is occluded, e.g., by an intermediate object occluding another object of interest, then the other LiDAR device may not be occluded and can detect points at the location or object of interest. For example, the intermediate object may be another vehicle and the object of interest may be a pedestrian walking behind the other vehicle; detecting the pedestrian's movement may be important to ensuring that the AV 1300 will avoid crossing the path of the pedestrian.

As indicated above, if each LiDAR device 1302, 1304 generates its own point cloud, the two point clouds 1316 and 1318 are consolidated, e.g., for use by the perception module 402 (FIG. 4) according to the techniques described below. A consolidated point cloud includes the points from both point clouds 1316 and 1318. In an embodiment, the two point clouds 1316 and 1318 are consolidated or merged or amalgamated or blended together as soon as each of the LiDAR device 1302 and 1304 start generating the point clouds 1316 and 1318 respectively. In an embodiment, the two point clouds 1316 and 1318 are merged after the LiDAR devices 1302 and 1304 finish generating point clouds 1316 and 1318 respectively. One technique for consolidating the point clouds is to normalize the coordinates of each of the points to a common point of reference, e.g., a particular location 1320 on the AV 1300. In this manner, the consolidated point cloud (sometimes referred to as a merged point cloud) is defined using the particular location 1320 as the origin (e.g., coordinates 0,0,0 on Cartesian x-y-z axes, or an origin defined using polar coordinates as described in more detail below). The points from the two point clouds 1316 and 1318 are translated to the consolidated point cloud by normalizing the coordinates to the common origin. In other words, if one point from one cloud and another point from the other cloud were detected at approximately the same location in the environment 190, their coordinates are changed so that they both have approximately the same coordinates and thus occupy approximately the same location in the consolidated point cloud.

One technique for consolidating the point clouds involves associating each point with a timestamp (e.g., time at which a point was detected) and using the timestamps to determine how points from different point clouds are spatially related to each other. In an embodiment, each LiDAR device 1302, 1304 assigns a timestamp to each point when the point is detected. In general, the timestamps of the points are be used to coordinate between two or more LiDARs that have different starting angles and/or different frequencies. One LiDAR may observe a point corresponding to a given location at time t=x, while the second LiDAR may observe a point corresponding to the same location at time t=y. The relationship between x and y can be evaluated based on information about the starting angles and frequencies.

Figure 15:
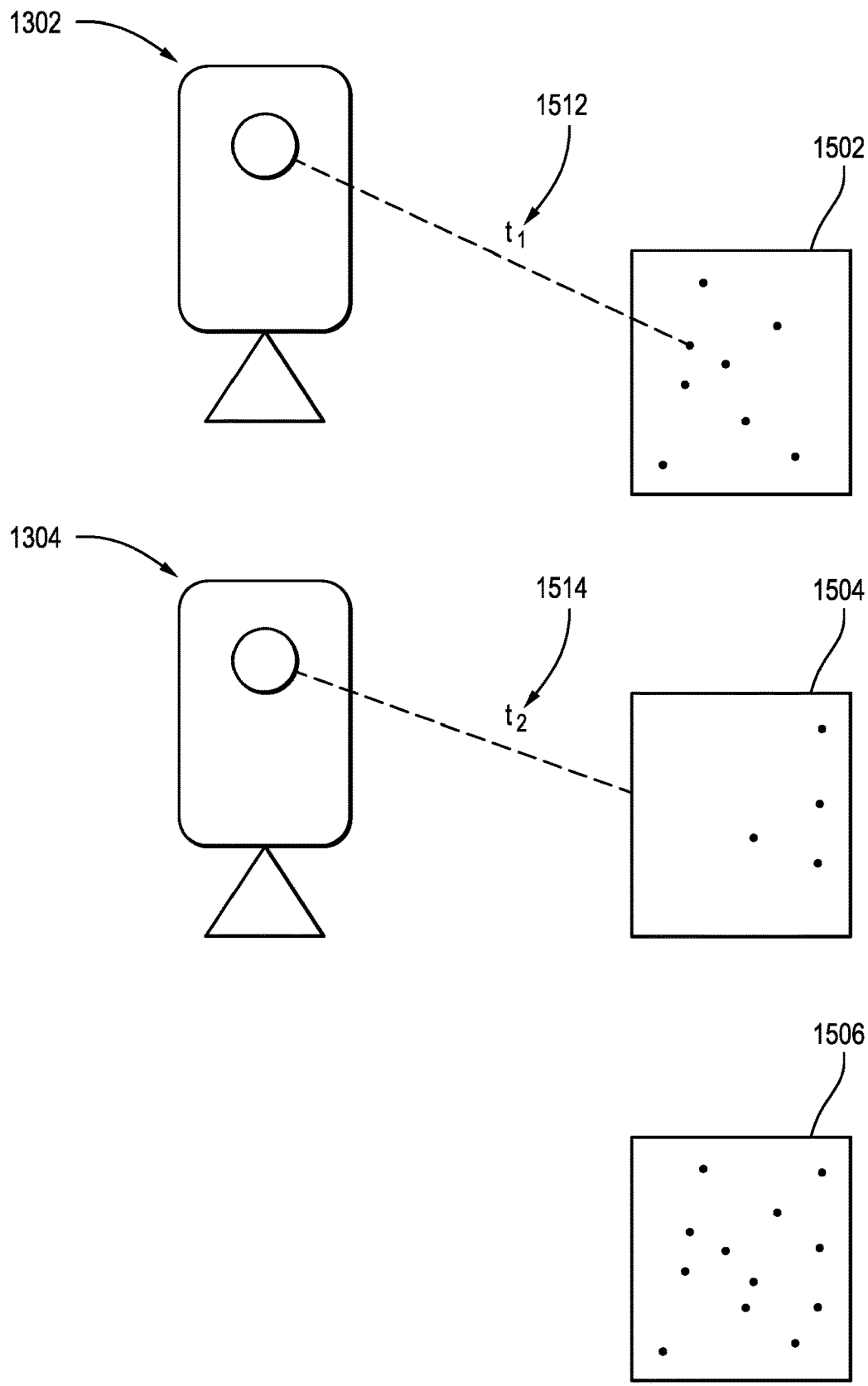

As shown in FIG. 15, in an embodiment, a LiDAR device 1302 detects a collection of points located near each other at the same time. A collection of points located near each other detected at the same time is referred to as a block 1502. Because a typical LiDAR device emits light in pulses, a block 1502 represents points detected upon a particular pulse of the LiDAR device light emitter. The time at which the light emitter of the LiDAR device emits light is used to determine the timestamp to assign the points of the block 1502. There is one timestamp assigned to the first emission of a diode in a particular block. Subsequent emission from the other diodes in the block can be calculated based on the inherent LiDAR properties for example azimuth angle. In an embodiment, each point of the block 1502 is assigned an offset, e.g., to compensate for the difference in locations between points of the block 1502. In an embodiment, this offset is a mechanical property of a LiDAR that is predetermined by the manufacturer during the manufacturing of the LiDAR. The spatial location of each block 1502 is known based on the angle of the laser emitter (sometimes referred to as the azimuth, or angle on the horizontal plane) of the LiDAR device 1302 at the time at which the block 1502 is detected.

In an example scenario, one of the LiDAR devices 1302 detects a block 1502 of points at a first time 1512, and the other LiDAR device 1304 detects a block 1504 of points at a second time 1514. For example, if the LiDAR devices 1302, 1304 have the same frequency of ten hertz but starting angles that are 180 degrees apart, the first time 1512 is t1=100 ms and the second time 1514 is t2=150 ms. In this example scenario, the two blocks 1502, 1504 represent points detected at the same location on an object. Because the two LiDAR devices 1302, 1304 are at different positions on the AV 1300, the two blocks 1502, 1504 will have been detected at different angles (azimuths) relative to their respective detecting LiDAR devices 1302, 1304. Because the blocks 1502, 1504 have different times of detection and different azimuths, additional processing is used to determine that the points in the blocks 1502, 1504 are the same location.

Continuing with the same example scenario, the perception module 402 (FIG. 4) receives the blocks 1502, 1504, timestamps (e.g., based on the first time 1512 and the second time 1514), the frequencies, and the starting angles to generate consolidated point cloud information 1506, e.g., containing the points from both of the blocks 1502, 1504. The coordinates of all of the points in the consolidated point cloud information 1506 are expressed relative to the same origin, e.g., the location 1320 shown in FIG. 13.

As an example of the type of calculation performed, the perception module 402 uses the starting angle of the first LiDAR device 1302 to determine a location of the first block of points detected by the LiDAR device (e.g., the block of points detected at t=0). For example, if the starting angle of the first LiDAR device corresponds to a position of the light emitter of zero degrees, then the perception module 402 can determine that a point in the first block of points is at a location corresponding to zero degrees and calculate the coordinates relative to the origin of the consolidated point cloud using the known location of the LiDAR device 1302. If a point has a timestamp indicating that it was detected at t=50 ms, and the frequency is ten hertz, then the perception module 402 can determine that the point was detected when the light emitter was at an angle (azimuth) of 180 degrees, because the emitter takes 50 ms to complete half of a rotation. Similar calculations can be performed using the points from the other LiDAR device 1304.

FIG. 16 shows components of a system used to generate a consolidated point cloud 1600. Each LiDAR device 1602, 1612 has a processor 1604, 1614 (e.g., microprocessor, microcontroller) each of which is configured with a respective starting angle 1606, 1616 and frequency 1608, 1618. In use, the LiDAR devices 1602, 1612 generates point clouds 1622, 1624 that are received by a processor 1626 (e.g., an implementation of or component of the perception module 402 shown in FIG. 4). The points of the point clouds 1622, 1624 are associated with timestamp data 1628, 1630. The processor 1626 uses the starting angles 1606, 1616, frequencies 1608, 1618, and timestamp data 1628, 1630 to generate the consolidated point cloud 1600. In an embodiment, the LiDAR devices 1602, 1612 are synchronized, e.g., operate according to a common time reference and/or have synchronized clocks. In an embodiment, the processors 1604, 1614 share a common clock 1632 so that their timestamps are generated from a common reference point. In other words, a point having timestamp of t=x generated by one of the LiDAR devices will have been detected at the same time as a point having a timestamp of t=x generated by the other synchronized LiDAR device(s). In an embodiment, the processor 1626 configures the starting angles 1606, 1616 and/or the frequencies 1608, 1618.

Figure 17A:
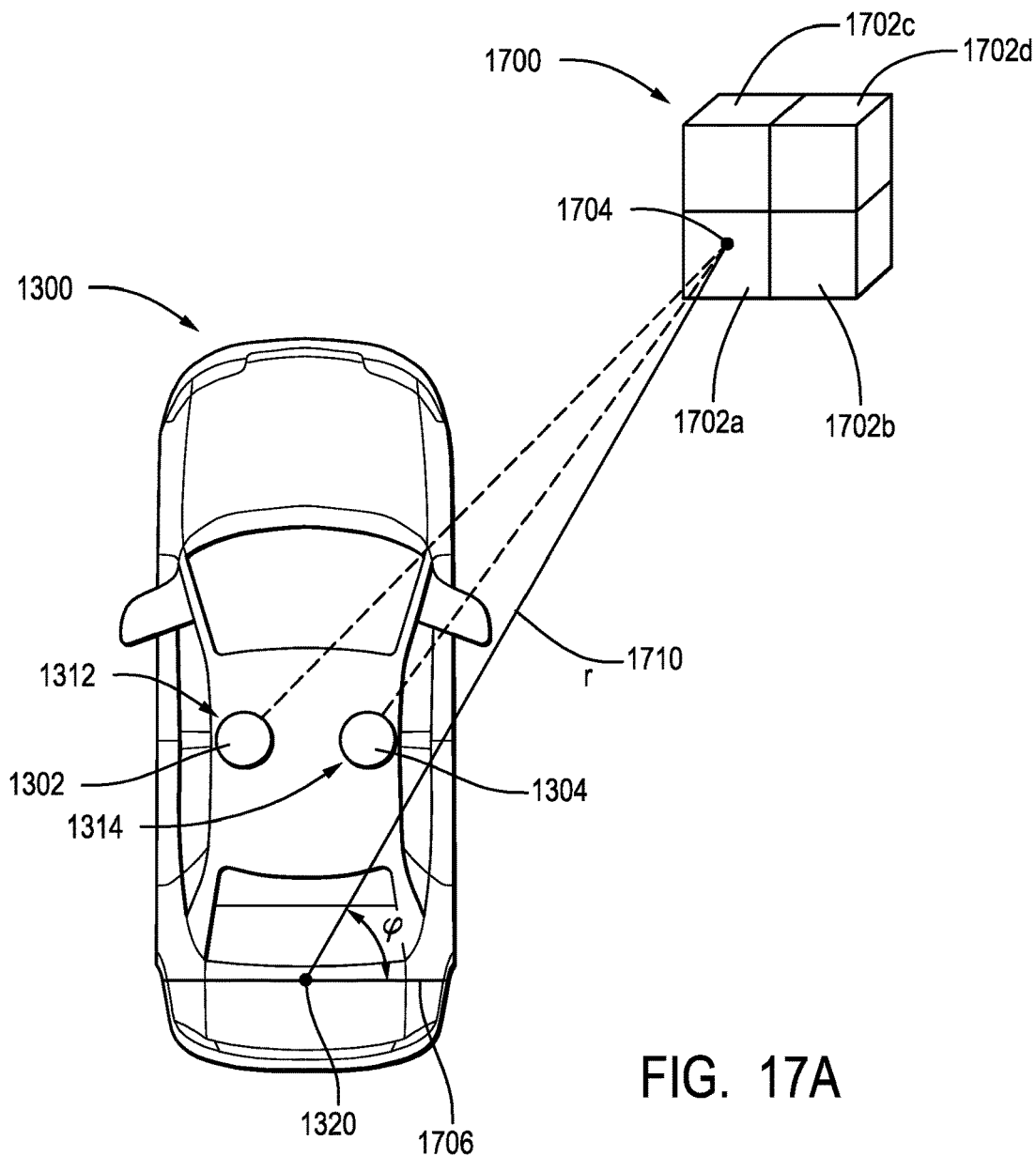
FIGS. 17A and 17B show a representation of a consolidated point cloud in the form of a collection of polar voxels.
Figure 17B:
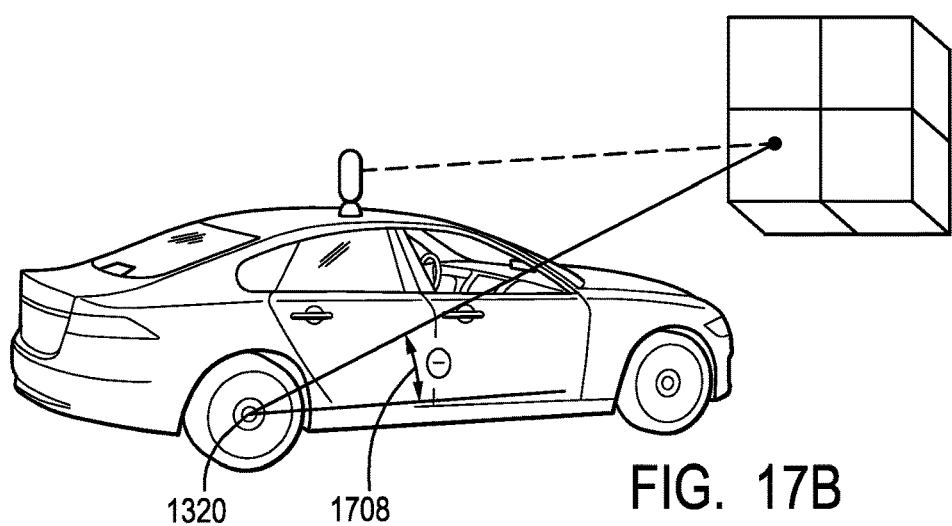

FIGS. 17A and 17B show a representation of a consolidated point cloud 1700 in the form of a collection of polar voxels 1702a-1702d. In an embodiment, the points detected by multiple LiDAR devices are modeled as polar voxels, and the points detected by the LiDAR devices are placed at the corresponding coordinates within a polar voxel. A voxel (sometimes referred to as a volume element) is a unit of volume in a data structure that represents a three-dimensional space. A point 1704 within a polar voxel 1702a is defined by polar coordinates, in contrast to Cartesian coordinates used with Cartesian voxels. A polar coordinate has three values—an azimuth (sometimes referred to as a horizontal angle), an altitude (sometimes referred to as a vertical angle), and a radius. The point 504 shown in FIGS. 17A and 17B has an azimuth 1706 and an altitude 1708 defined relative to an origin, which is (as in the examples above) a location 1320 at the center of the real axle of the AV 1300. Similarly, the radius 1710 of the point is a distance from the location 1320. In an embodiment, the data structure representing the polar voxels 1702a-1702d is maintained by the perception module 402 (FIG. 4) and is an implementation of the consolidated point cloud 1600 shown in FIG. 16.

The use of polar voxels enables the perception module 402 (or other data processing system) to segment a consolidated point cloud, e.g., to improve processing efficiency. In an embodiment, some of the polar voxels 1 702a-1702b are updated relatively frequently (that is, points from the LiDAR devices 1302, 1304 are incorporated into the polar voxels 1 702a-1702b), while some of the other polar voxels 1702c-1702d are updated relatively infrequently. In an embodiment, updating the polar voxels 1702a-1702d involves changing the resolution of the polar voxels a-d, i.e. changing the volume of 3-D space captured per voxel. In this way, polar voxels representing an area of interest (e.g., an area in which other vehicles, pedestrians, and other objects of interest are likely to be present) are updated relatively frequently, for example once every rotation to ensure that their data is likely to be current, while other polar voxels are updated relatively infrequently, for example once every five rotations, to save data processing resources. The specific update frequency of a polar voxel may be adjusted based on the motion of the vehicle and environmental conditions such as weather, traffic, pedestrians, etc. In an embodiment, the frequency of updating some of the polar voxels is predetermined classifying areas of interests in different scenarios based on historical data. This classification may be based on classical or machine learning techniques. For example, machine learning models may determine that the most important area of interest in an area with heavy pedestrian traffic may be in front of the vehicle. Therefore, the polar voxels that quantify the portion of environment 190 in front of vehicle are updated most frequently. In an embodiment, the polar voxels 1702a-1702d may different resolutions based on the various factors. For example, some of the polar voxels that quantify the portion of environment

190 in front of the vehicle may have the greatest resolution (i.e. the smallest size as size of polar voxels is inversely proportionate to the resolution) to ensure high fidelity object detection, classification, and tracking by the perception system in front of the vehicle.

In an embodiment, the volume of each of the polar voxels 1702a-1702d varies depending on the environment of the AV 1300. For example, the polar voxels can be relatively small, which corresponds to a relatively higher resolution and requires more processing resources, or relatively large, which corresponds to a relatively lower resolution and requires less processing resources. In this way, the size (e.g., resolution) of the voxel can be adapted to the environment of the AV 1300. For example, if the AV 1300 is in a dense environment (e.g., an urban street), then the resolution of the voxels is configured to be higher. In contrast, if the AV 1300 is in a sparse environment (e.g., an interstate highway), then the resolution of the voxel is configured to be lower.

In an embodiment, the polar voxels 1702a-1702d are updated based on one or more metrics associated with the respective polar voxel. One type of metric is the time at which the polar voxel was last updated. In an embodiment, the polar voxels 1702a-1702d are updated in a staggered fashion in which some of the voxels are updated at a different time than the other voxels are updated. The time at which a particular polar voxel was updated can be used to determine if that polar voxel is due for an update. Another metric is which LiDAR devices are used to update the polar voxel. In an embodiment, some of the polar voxels 1702a-1702d are updated using data from two LiDAR devices 1302, 1304, while some of the polar voxels 1702a-1702d are updated using data from only one of the LiDAR devices 1302, 1304. Another voxel metric is the density of the points of the polar voxel. If the points of a particular polar voxel have a high density, indicating that the voxel is likely to contain a physical object, the voxel may be updated more frequently to ensure current information about that object. In an embodiment, the density of the points of a particular polar voxel is measured on a regular basis, e.g., by the perception module 404. In this embodiment, if the density does not meet a threshold, the frequency of updates for the voxel is lowered. In an embodiment, some other voxel metrics include timestamp of the last update for a particular polar voxel, the number of LiDARs that are updating a particular given polar voxel, covariance of the spread of points in a particular polar voxel, and the ratio of the number of LiDARs attached to the roof of the vehicles to the number of LiDARs attached to the body of the vehicle.

Figure 18:
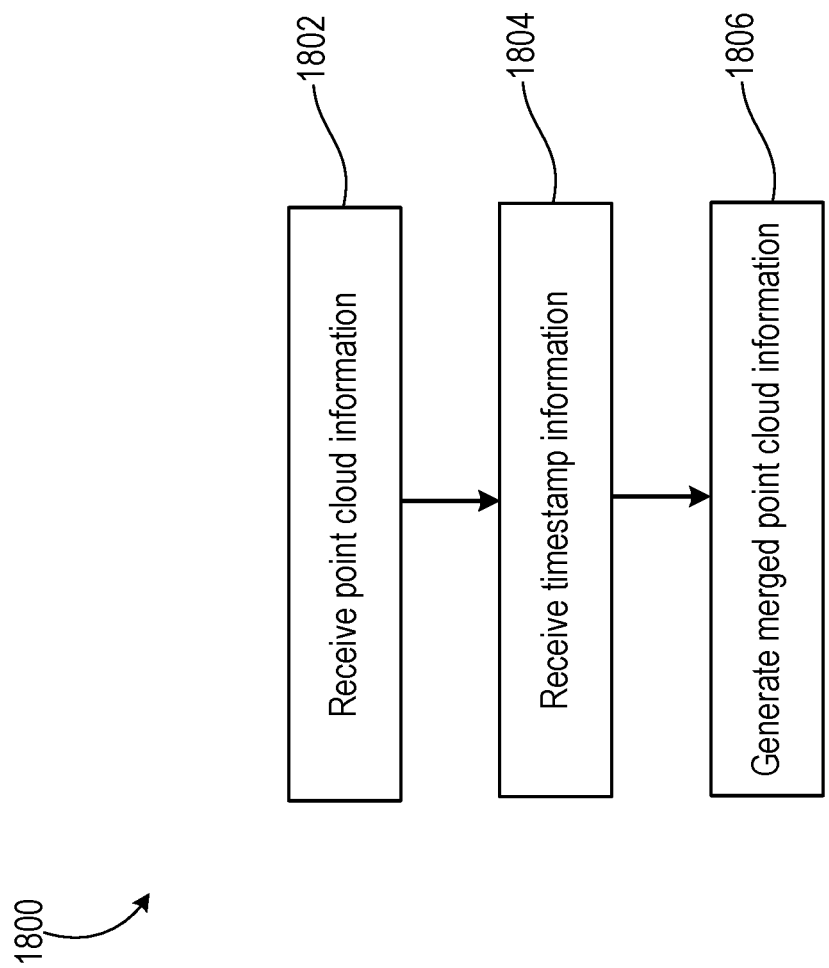
FIGS. 18-19 are flowcharts representing a processes for operating a vehicle based on point cloud information.

FIG. 18 is a flowchart representing a process 1800 for operating a vehicle based on point cloud information. In an embodiment, the vehicle is the AV 1300 shown in FIG. 13, and the process 1800 is carried out by a processor such as the processor 1626 shown in FIG. 16 or the perception module 402 shown in FIG. 4.

The processor receives 1802 first LiDAR point cloud information from a first LiDAR device and second LiDAR point cloud information from a second LiDAR device. In an embodiment, the LiDAR devices are the LiDAR devices 1302, 1304 shown in FIG. 13, and the LiDAR point cloud information is the point clouds 1622, 1624 shown in FIG. 16. The first LiDAR device and the second LiDAR device are respectively configured to detect light reflected from objects proximate to the vehicle and generate LiDAR point cloud information based on the detected light. The first LiDAR device is at a first position of the vehicle and is configured for a first starting angle and a first frequency, and the second LiDAR device is at a second position of the vehicle and is configured for a second starting angle and a second frequency. In an embodiment, the first frequency is different from the second frequency. In an embodiment, the first LiDAR device is configured for a first starting angle different from the second starting angle. In an embodiment, the LiDAR devices are synchronized, e.g., operate according to a common time reference and/or have synchronized clocks.

The processor receives 1804 first timestamp information associated with the first LiDAR point cloud information and second timestamp information associated with the second LiDAR point cloud information. In an embodiment, the timestamp information is the timestamp data 1628, 1630 shown in FIG. 16.

In an embodiment, each point observed by a LiDAR is associated with a timestamp. The first timestamp information represents a first time, wherein the first time is a time at which a first point of the first LiDAR point cloud information was detected, and the second timestamp information represents a second time, wherein the second time is a time at which a second point of the second LiDAR point cloud information was detected. For example, the time at which the first point was detected is based on a laser emission time of a block of points detected at a first azimuth and a first offset value specific to the first point. In an embodiment, the processor also determines a correspondence between the first time and the second time in accordance with the first starting angle, first frequency, second starting angle, and second frequency.

The processor generates 1806 third point cloud information according to merging the first and second LiDAR point cloud information. Techniques for merging point cloud information are described above with respect to FIGS. 13-15. The generation of the third point cloud information is performed in accordance with the first and second LiDAR point cloud information, first and second timestamp information, first starting angle, a first frequency, second starting angle, and second frequency. In an embodiment, the generation of the third point cloud information includes processing the first LiDAR point cloud information and second LiDAR point cloud information based on the first position and the second position.

In an embodiment, the processor determines that a first detected light point of the first LiDAR point cloud information and a second detected light point of the second LiDAR point cloud information correspond to the same location relative to the vehicle, e.g., a distance at the same azimuth and altitude relative to a fixed location of the vehicle, such as the center of the rear axle. In accordance with this determination, the processor generates combined LiDAR point cloud information including the first and second detected light points.

In an embodiment, the processor generates a data structure (e.g., the consolidated point cloud 1700 shown in FIGS. 17A-17B) representing voxels oriented in accordance with polar coordinates, wherein a respective point of the first LiDAR point cloud information or second LiDAR point cloud information is assigned to one of the voxels of the data structure. In an embodiment, this includes generating a quantity of voxels of the data structure in accordance with a predetermined resolution. In an embodiment, this also includes receiving a plurality of voxel metrics and merging the first point cloud information and second point cloud information to generate the third point cloud information based on the voxel metrics. In an embodiment, a quantity of voxels of the data structure is generated in accordance with a number of the objects proximate to the vehicle.

Figure 19:
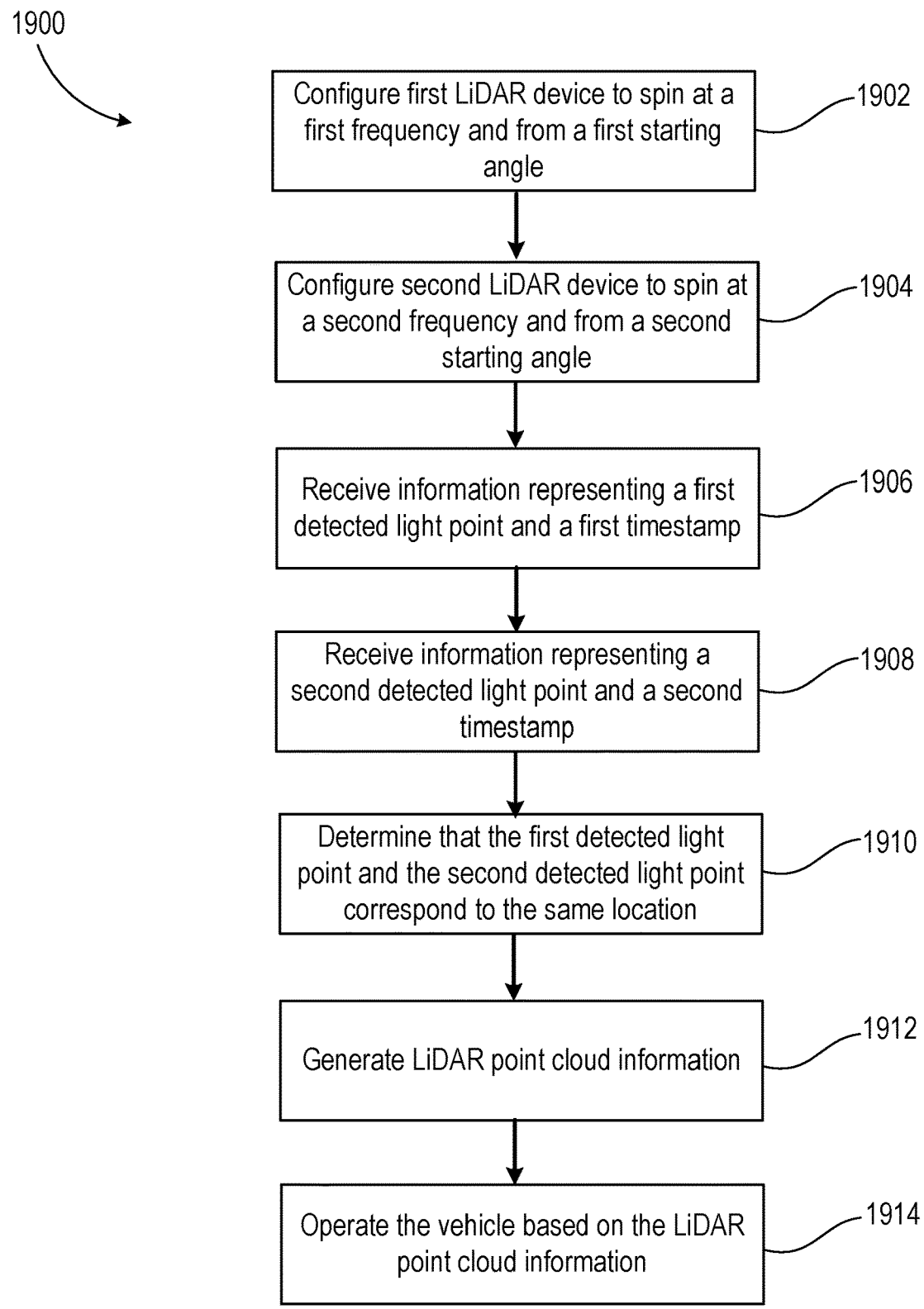

FIG. 19 is a flowchart representing a process 1900 for operating a vehicle based on point cloud information. In an embodiment, the vehicle is the AV 1300 shown in FIG. 13, and the process 1900 is carried out by a processor such as the processor 1626 shown in FIG. 16 or the perception module 402 shown in FIG. 4.

The processor configures 1902 a first LiDAR device to spin at a first frequency and from a first starting angle. In an implementation, the first LiDAR device is the LiDAR device 1302 shown in FIG. 13, the first frequency is the frequency 1410 shown in FIG. 14, and the first starting angle is the starting angle 1402 shown in FIG. 14.

The processor configures 1904 a second LiDAR device to spin at a second frequency and from a second starting angle different from the first starting angle. In an implementation, the second LiDAR device is the LiDAR device 1304 shown in FIG. 13, the first frequency is the frequency 1412 shown in FIG. 14, and the first starting angle is the starting angle 1404 shown in FIG. 14.

The processor receives 1906, from the first LiDAR device, information representing a first detected light point and a first timestamp representing a time at which the first point was illuminated. The processor receives 1908, from the second LiDAR device, information representing a second detected light point and a second timestamp representing a time at which the second point was illuminated. The difference between the time of the first timestamp and the time of the second timestamp is less than an inverse of the first frequency. In other words, the timestamps indicate that the second detected light point was detected before the first LiDAR device completed a full rotation since detecting the first detected light point.

The processor determines 1910 that the first detected light point and the second detected light point correspond to the same location relative to the vehicle. Techniques for making this determination are described above, e.g., with respect to FIG. 15. In response, the processor generates 1912 LiDAR point cloud information including the first and second detected light points at the same coordinates relative to a fixed origin of the vehicle. In an embodiment, the generated LiDAR point cloud information is an example of the consolidated point cloud information 1600 shown in FIG. 16. The vehicle is then operated 1914 according to the LiDAR point cloud information, e.g., by a control module of the vehicle in communication with the processor 1626 or perception module 404.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A vehicle, comprising:
at least two LiDAR devices configured to detect light reflected from objects proximate to the vehicle and generate LiDAR point cloud information based on the detected light, wherein a first LiDAR device is at a first position of the vehicle and is configured for a first starting angle and a first frequency, and a second LiDAR device is at a second position of the vehicle and is configured for a second starting angle and a second frequency;
one or more computer-readable media storing computer-executable instructions;
one or more processors communicatively coupled to the at least two LiDAR devices and configured to execute the computer executable instructions, the execution carrying out operations including:
receiving first LiDAR point cloud information from the first LiDAR device and second LiDAR point cloud information from the second LiDAR device,
receiving first timestamp information associated with the first LiDAR point cloud information and second timestamp information associated with the second LiDAR point cloud information, and
in accordance with the first and second LiDAR point cloud information, first and second timestamp information, first starting angle, a first frequency, second starting angle, and second frequency, generating third point cloud information merging the first and second LiDAR point cloud information, wherein generating the third point cloud information comprises generating a data structure representing voxels oriented in accordance with polar coordinates, wherein a respective point of the first LiDAR point cloud information or second LiDAR point cloud information is assigned to one of the voxels of the data structure; and
a control circuit communicatively coupled to the one or more processors, wherein the control circuit is configured to operate the vehicle based upon the third LiDAR point cloud information.

2. The vehicle of claim 1, the operations including determining that a first detected light point of the first LiDAR point cloud information and a second detected light point of the second LiDAR point cloud information correspond to the same location relative to the vehicle, and
in accordance with the first and second information corresponding to the same location relative to the vehicle, generating combined LiDAR point cloud information including the first and second detected light points.

3. The vehicle of claim 2, wherein the first timestamp information represents a first time, wherein the first time is a time at which a first point of the first LiDAR point cloud information was detected, and the second timestamp information represents a second time, wherein the second time is a time at which a second point of the second LiDAR point cloud information was detected.

4. The vehicle of claim 3, wherein the time at which the first point was detected is based on a laser emission time of a block of points detected at a first azimuth and a first offset value specific to the first point.

5. The vehicle of claim 3, the operations comprising determining a correspondence between the first time and the second time in accordance with the first starting angle, first frequency, second starting angle, and second frequency.

6. The vehicle of claim 1, wherein the first LiDAR device is configured for a first starting angle different from the second starting angle.

7. The vehicle of claim 1, wherein generating third point cloud information comprises generating a quantity of voxels of the data structure in accordance with a predetermined resolution.

8. The vehicle of claim 1, the execution carrying out operations further comprising:
receiving a plurality of voxel metrics; and
merging the first point cloud information and second point cloud information to generate the third point cloud information based on the voxel metrics.

9. The vehicle of claim 1, wherein a quantity of voxels of the data structure is generated in accordance with a number of the objects proximate to the vehicle.

10. The vehicle of claim 1, wherein a first voxel is associated with a frequency at which point cloud data is used to update points of the voxel.

11. The vehicle of claim 10, the execution carrying out operations further comprising determining if the voxel meets a threshold of point density, and based on the determination, adjusting the frequency at which the point cloud data is used to update the points of the voxel.

12. The vehicle of claim 1, the execution carrying out operations further comprising processing the first LiDAR point cloud information and second LiDAR point cloud information based on the first position and the second position.

13. The vehicle of claim 1, wherein the at least two LiDAR devices are synchronized.

14. The vehicle of claim 1, wherein the first frequency is different from the second frequency.

15. A method comprising:
on a vehicle:
receiving first LiDAR point cloud information from a first LiDAR device and second LiDAR point cloud information from a second LiDAR device, wherein the first LiDAR device and the second LiDAR device are respectively configured to detect light reflected from objects proximate to the vehicle and generate LiDAR point cloud information based on the detected light, wherein the first LiDAR device is at a first position of the vehicle and is configured for a first starting angle and a first frequency, and the second LiDAR device is at a second position of the vehicle and is configured for a second starting angle and a second frequency;
receiving first timestamp information associated with the first LiDAR point cloud information and second timestamp information associated with the second LiDAR point cloud information; and
in accordance with the first and second LiDAR point cloud information, first and second timestamp information, first starting angle, a first frequency, second starting angle, and second frequency, generating third point cloud information according to merging the first and second LiDAR point cloud information, wherein generating the third point cloud information comprises generating a data structure representing voxels oriented in accordance with polar coordinates, wherein a respective point of the first LiDAR point cloud information or second LiDAR point cloud information is assigned to one of the voxels of the data structure; and operating the vehicle based upon the third LiDAR point cloud information.

16. A non-transitory computer-readable storage medium comprising one or more programs for execution by one or more processors of a first device of a vehicle, the one or more programs including instructions which, when executed by the one or more processors, cause the first device to perform operations comprising:

receiving first LiDAR point cloud information from a first LiDAR device and second LiDAR point cloud information from a second LiDAR device, wherein the first LiDAR device and the second LiDAR device are respectively configured to detect light reflected from objects proximate to the vehicle and generate LiDAR point cloud information based on the detected light, wherein the first LiDAR device is at a first position of the vehicle and is configured for a first starting angle and a first frequency, and the second LiDAR device is at a second position of the vehicle and is configured for a second starting angle and a second frequency;

receiving first timestamp information associated with the first LiDAR point cloud information and second timestamp information associated with the second LiDAR point cloud information; and in accordance with the first and second LiDAR point cloud information, first and second timestamp information, first starting angle, a first frequency, second starting angle, and second frequency, generating third point cloud information according to merging the first and second LiDAR point cloud information, wherein generating the third point cloud information comprises generating a data structure representing voxels oriented in accordance with polar coordinates, wherein a respective point of the first LiDAR point cloud information or second LiDAR point cloud information is assigned to one of the voxels of the data structure; and operating the vehicle based upon the third LiDAR point cloud information.

* * * * *

UNITED STATES PATENT AND TRADEMARK OFFICE
CERTIFICATE OF CORRECTION

| | |
|---|---|
| PATENT NO. | : 11,333,762 B2 |
| APPLICATION NO. | : 16/779291 |
| DATED | : May 17, 2022 |
| INVENTOR(S) | : Di Cicco et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 76 days.

Signed and Sealed this
Twenty-ninth Day of August, 2023

*Katherine Kelly Vidal*

Katherine Kelly Vidal
*Director of the United States Patent and Trademark Office*